United States Patent
Lee

(10) Patent No.: US 11,422,653 B2
(45) Date of Patent: Aug. 23, 2022

(54) TOUCH AND DISPLAY CONTROL DEVICE WITH FAST TOUCH RESPONSIVENESS, DISPLAY DEVICE INCLUDING THE SAME, METHOD OF OPERATING THE SAME AND ELECTRONIC SYSTEM INCLUDING THE SAME

(71) Applicant: SAMSUNG ELECTRONICS CO., LTD., Suwon-si (KR)

(72) Inventor: Changju Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/189,503

(22) Filed: Mar. 2, 2021

(65) Prior Publication Data

US 2021/0349562 A1 Nov. 11, 2021

(30) Foreign Application Priority Data

May 11, 2020 (KR) .......................... 10-2020-0055916

(51) Int. Cl.
*G06F 3/041* (2006.01)
*G06F 3/0488* (2022.01)

(52) U.S. Cl.
CPC .......... *G06F 3/0412* (2013.01); *G06F 3/0488* (2013.01)

(58) Field of Classification Search
CPC .......... G06F 3/041–047; G06F 3/0488–04883; G06F 3/0446; G06F 3/0412; G06F 3/0416; G06F 3/044; G06F 3/0443
See application file for complete search history.

(56) References Cited

U.S. PATENT DOCUMENTS

| | | | |
|---|---|---|---|
| 8,044,940 B2 | 10/2011 | Narusawa | |
| 8,416,197 B2 | 4/2013 | Feng et al. | |
| 9,383,840 B2 | 7/2016 | Seto et al. | |
| 9,710,098 B2 | 7/2017 | Xiong et al. | |
| 9,804,709 B2 | 10/2017 | Seto et al. | |
| 10,156,976 B2 | 12/2018 | Kozintsev et al. | |
| 2010/0241957 A1* | 9/2010 | Kim | G06F 3/04886 715/702 |
| 2013/0135263 A1 | 5/2013 | Omura | |
| 2015/0277653 A1* | 10/2015 | Xiong | G06K 9/4604 345/173 |
| 2016/0189333 A1* | 6/2016 | Morein | G09G 5/39 345/555 |
| 2019/0012057 A1* | 1/2019 | Ko | G06F 9/451 |
| 2019/0121489 A1* | 4/2019 | Fleck | G06F 3/041 |

* cited by examiner

*Primary Examiner* — Sanjiv D. Patel
(74) *Attorney, Agent, or Firm* — F. Chau & Associates, LLC

(57) ABSTRACT

The present disclosure provides a touch and display control device with a touch screen controller and a display driver. The touch screen controller receives a touch sensing signal, generates touch raw data based on the touch sensing signal, and extracts touch information based on the touch raw data. The display driver receives an original image from a host processor, directly receives the touch information from the touch screen controller, generates touch trajectory information by accumulating the touch information, internally generates a touch image to be displayed with the original image based on the touch trajectory information, generates a composite image by synthesizing the original image and the touch image, and controls a display panel to display the composite image. The display driver includes a memory storing the touch trajectory information.

20 Claims, 24 Drawing Sheets

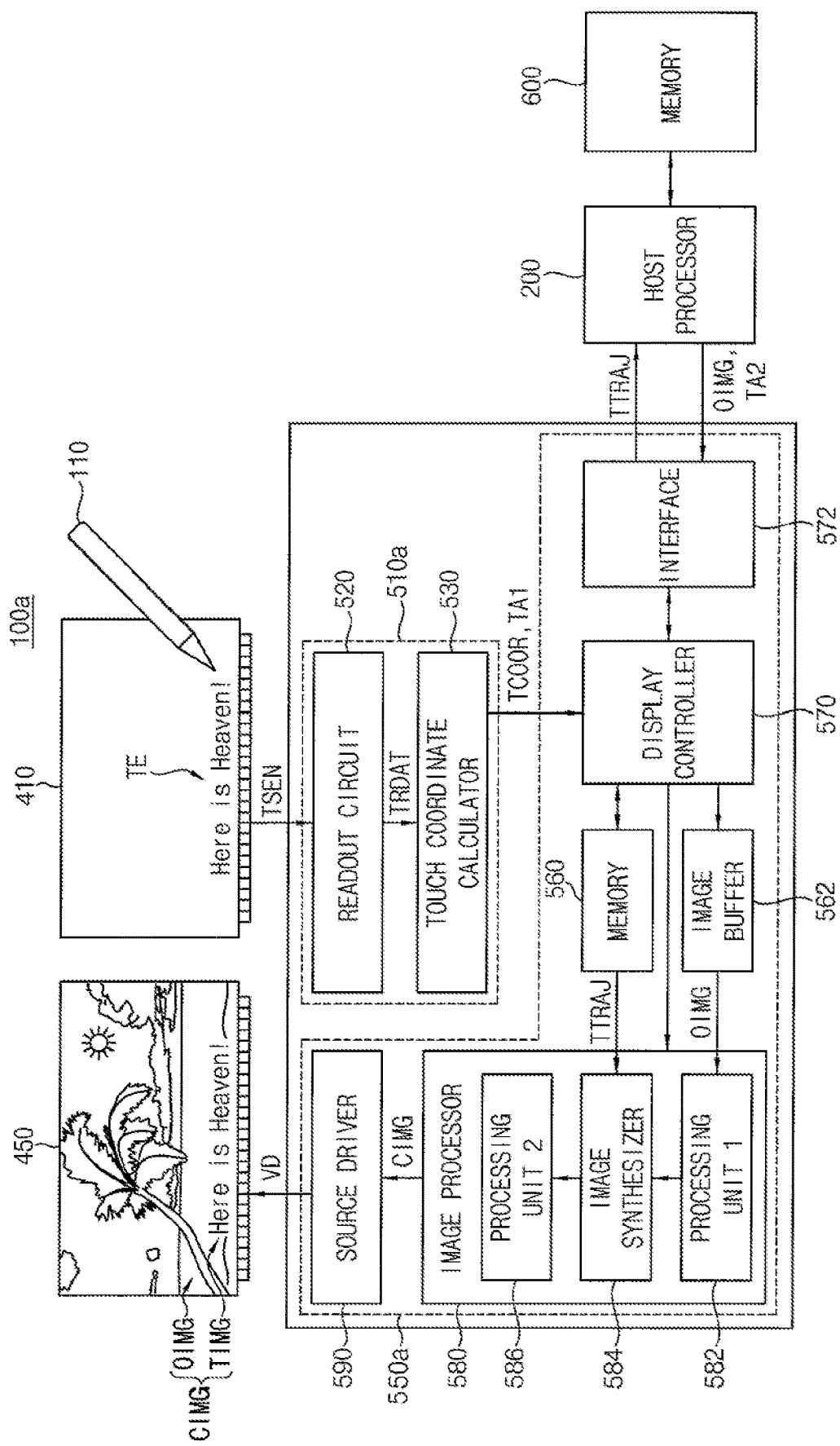

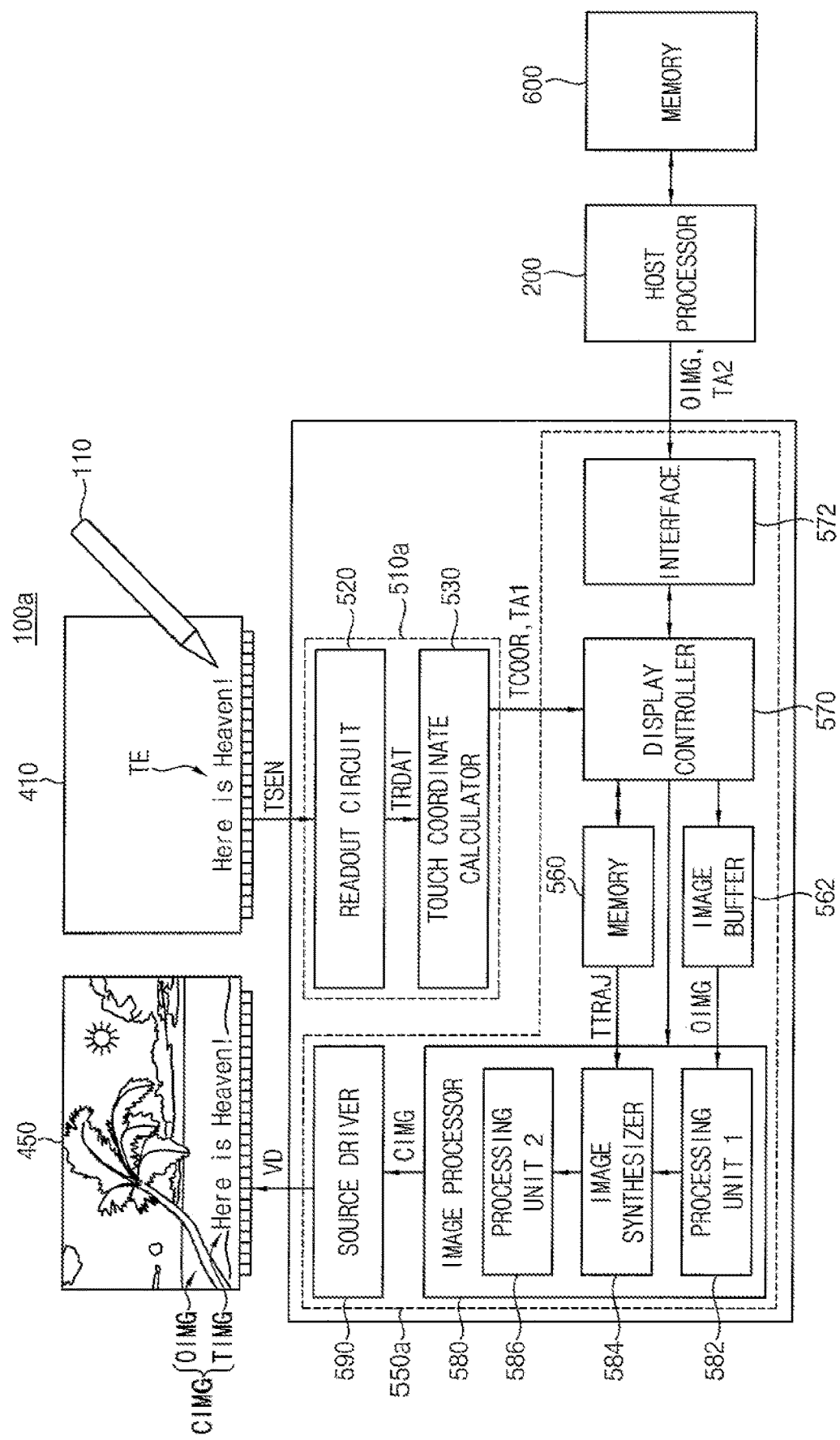

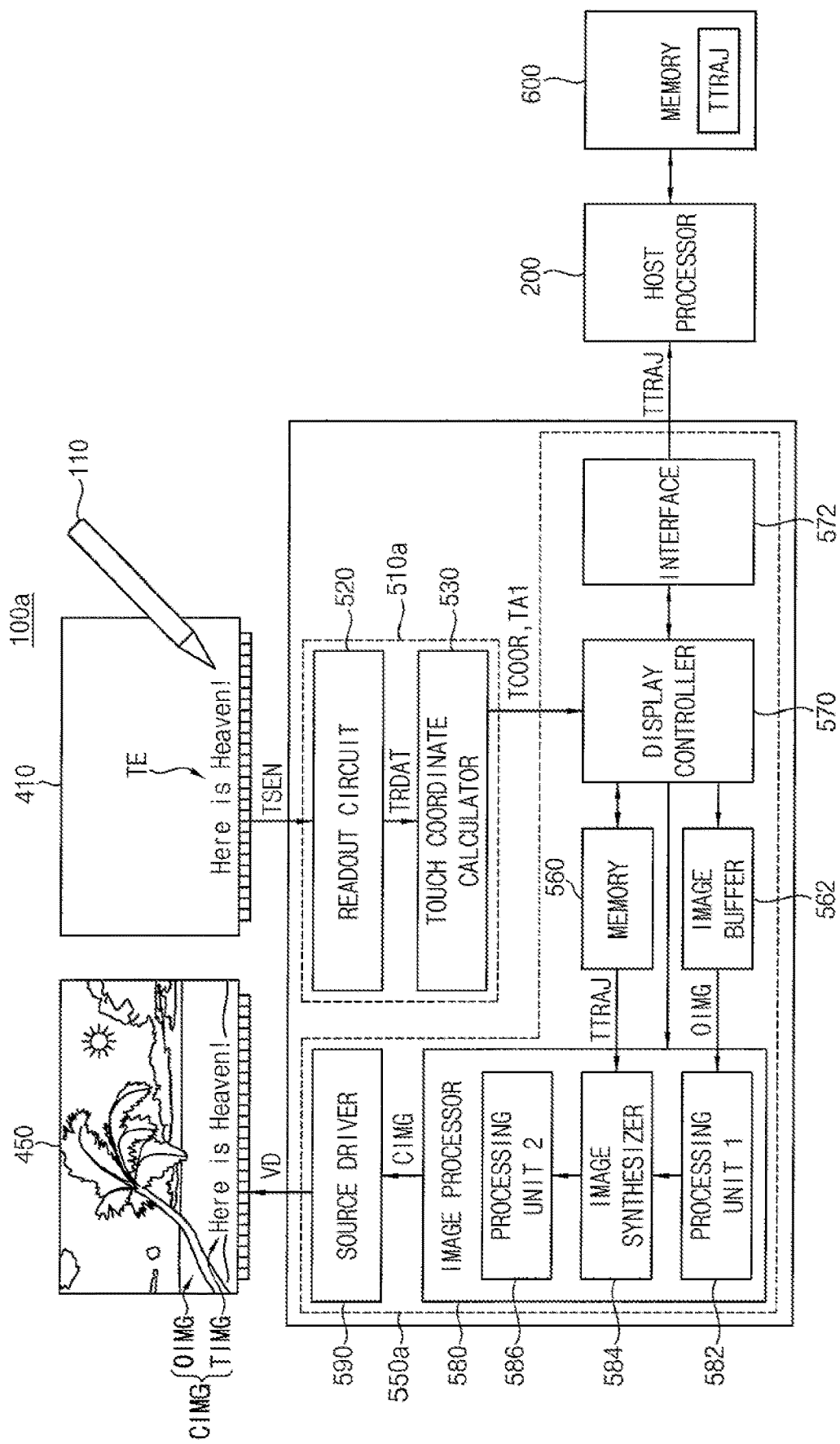

FIG. 4B

| TIME | COORDINATES | | | SHAPE | SIZE | | DIRECTION (DEGREE) | WRITING OBJECT | COLOR | ... |
|---|---|---|---|---|---|---|---|---|---|---|
| | X | Y | Z | | X | Y | | | | |
| 1 | 250 | 250 | 1 | CIRCLE | 4 | 4 | - | PENCIL | BLACK | |
| 2 | 255 | 250 | 1 | CIRCLE | 4 | 4 | - | PENCIL | BLACK | |
| 3 | 260 | 250 | 0 | CIRCLE | 4 | 4 | - | PENCIL | BLACK | |
| 4 | | | | | | | ... | | | |
| 5 | | | | | | | ... | | | |

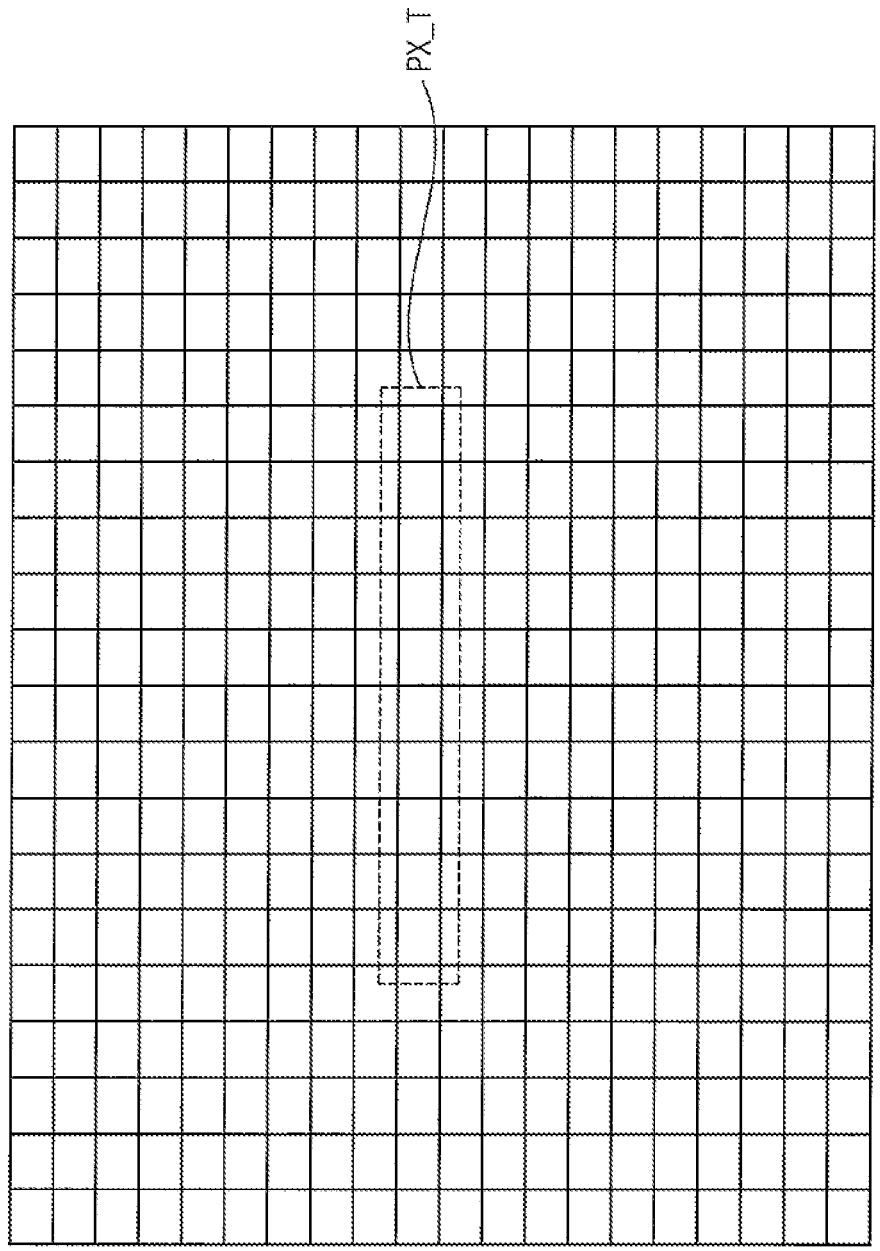

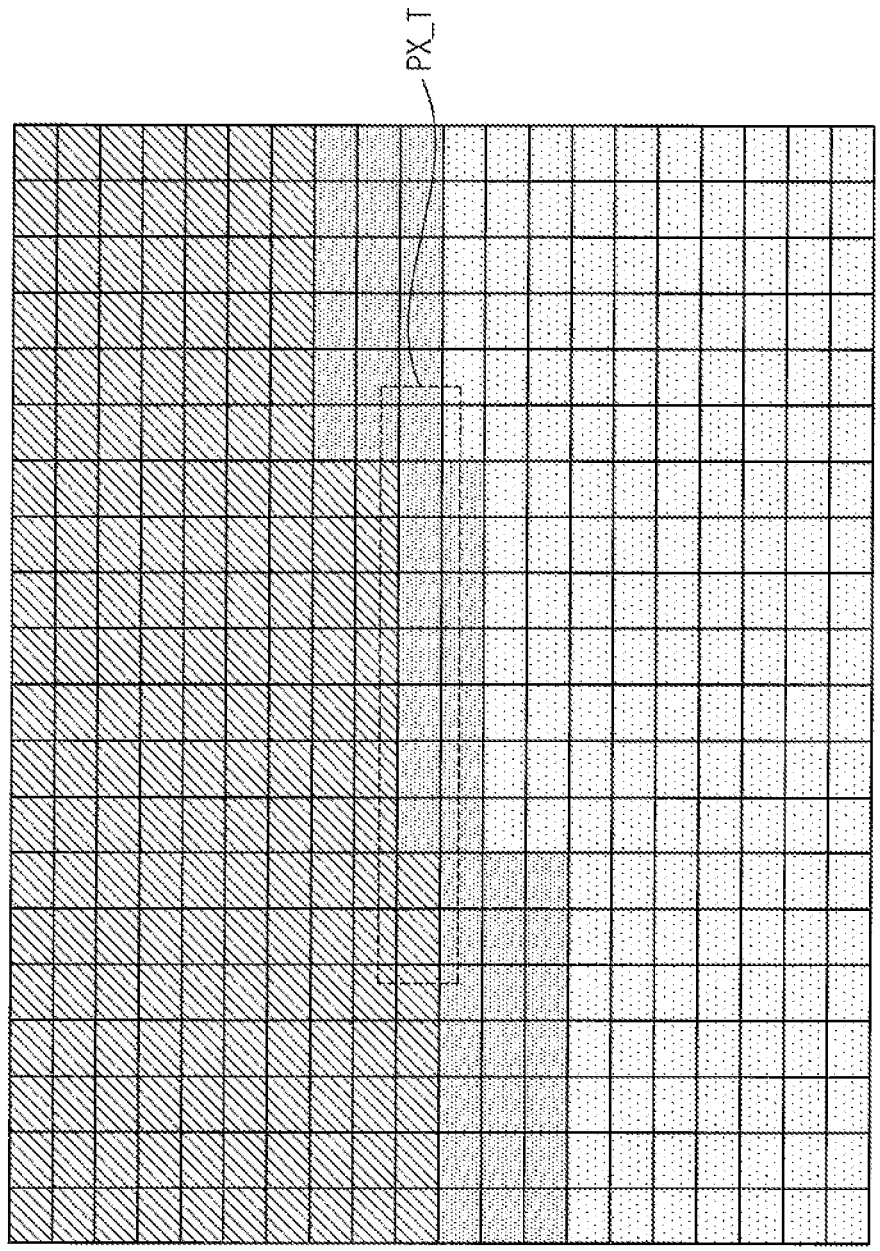

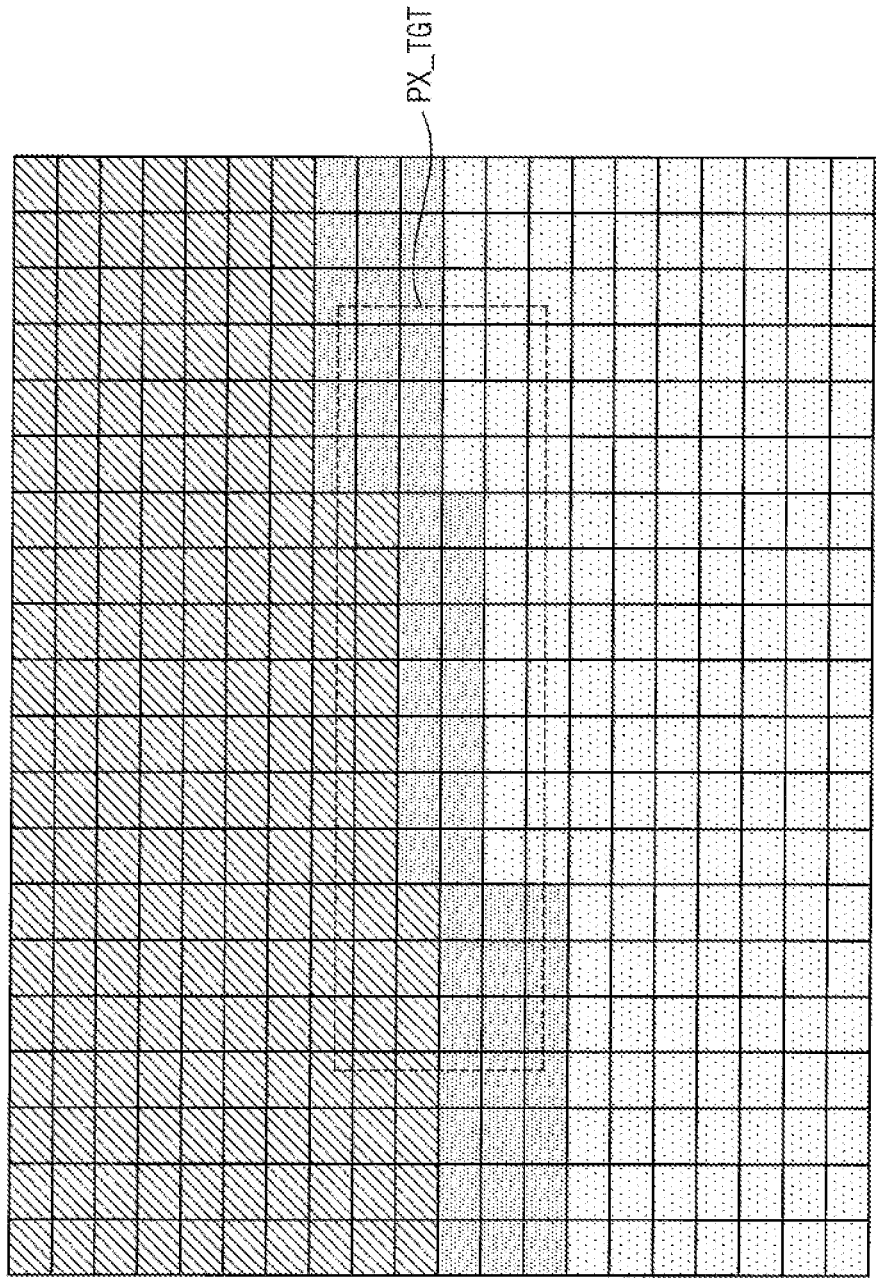

FIG. 9B

| TIME | TOUCH ID | COORDINATES ||| SHAPE | SIZE || DIRECTION (DEGREE) | WRITING OBJECT | COLOR | ... |
|      |          | X | Y | Z |       | X | Y |   |    |    |    |
|---|---|---|---|---|---|---|---|---|---|---|---|
| 1 | 1 | 250 | 250 | 1 | CIRCLE | 4 | 4 | - | PENCIL | BLACK | |
|   | 2 | 150 | 1150 | 0 | ELLIPSE | 4 | 6 | 45 | BRUSH | RED | |
|   | 3 | 750 | 850 | 0 | CIRCLE | 15 | 15 | - | ERASER | - | |
| 2 | 1 | 255 | 250 | 1 | CIRCLE | 4 | 4 | - | PENCIL | BLACK | |
|   | 2 | 152 | 1153 | 0 | ELLIPSE | 4 | 6 | 43 | BRUSH | RED | |
|   | 3 | 748 | 850 | 0 | CIRCLE | 15 | 15 | - | ERASER | - | |
| 3 | 1 | 260 | 250 | 2 | CIRCLE | 4 | 4 | - | PENCIL | BLACK | |
|   | 2 | 155 | 1154 | 0 | ELLIPSE | 4 | 6 | 40 | BRUSH | RED | |
|   | 3 | 746 | 850 | 0 | CIRCLE | 15 | 15 | - | ERASER | - | |
| 4 | | | | | | | | | | | ... |
| 5 | | | | | | | | | | | ... |

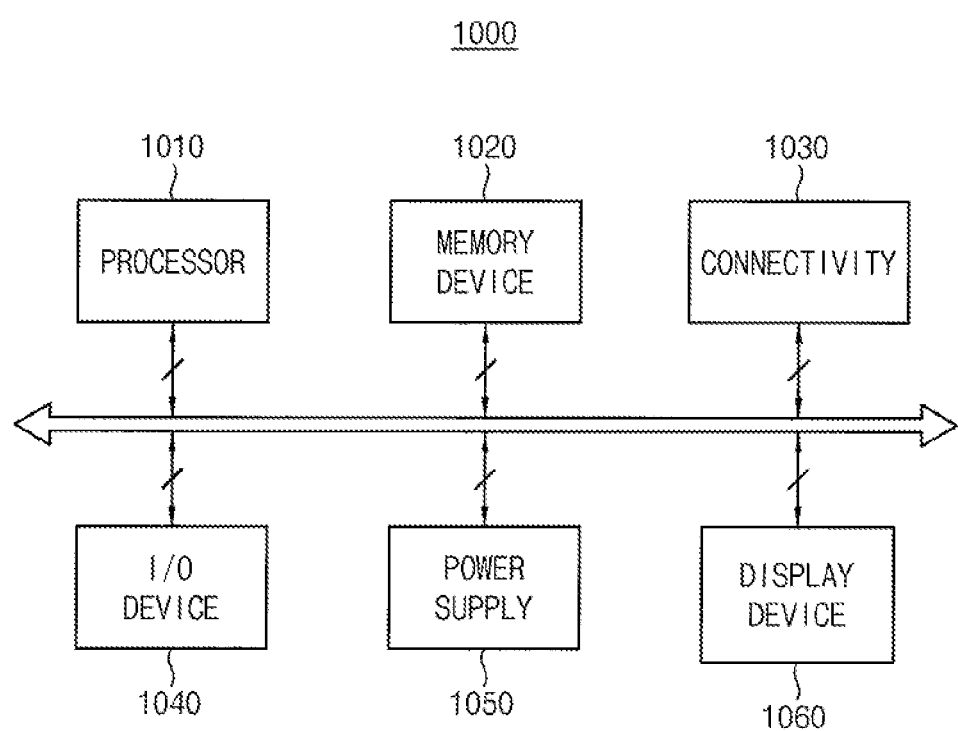

TOUCH AND DISPLAY CONTROL DEVICE WITH FAST TOUCH RESPONSIVENESS, DISPLAY DEVICE INCLUDING THE SAME, METHOD OF OPERATING THE SAME AND ELECTRONIC SYSTEM INCLUDING THE SAME

CROSS-REFERENCE TO RELATED APPLICATION

This application claims priority under 35 USC § 119 to Korean Patent Application No. 10-2020-0055916, filed on May 11, 2020 in the Korean Intellectual Property Office (KIPO), the contents of which are incorporated by reference herein in their entirety.

BACKGROUND

1. Technical Field

Example embodiments relate generally to semiconductor integrated circuits, and more particularly to touch and display control devices with fast touch responsiveness, display devices including the touch and display control devices, methods of operating the display devices, and electronic systems including the display devices.

2. Description of the Related Art

Display devices are devices used to convey information to a user in an electronic device such as a television, mobile phone, or computer. Display devices may include multiple light-emitting pixels. In some cases, display devices may also be used to receive user input. For example, users can create artwork, take notes, or perform photo editing on a display device using a touch input device such as a stylus pen.

However, when using a display device for writing input, users may experience a lag between the input and changes to the display. The delay time exists due to a long signal transmission path between the touch input device and the display response of the touch input device. For example, the signal transmission path can include a touch input sent to a processor, then sent to display controller.

The lag between the input and the change in the corresponding change to the display can lead to frustration for users attempting to draw, write, or edit on a display. Therefore, a fast response, or low latency, is desirable for improved writing feel by the user. Accordingly, there is a need in the art for display devices with a reduced delay between a touch input and a displayed response.

SUMMARY

At least one example embodiment of the present disclosure provides a touch and display control device with fast touch responsiveness.

At least one example embodiment of the present disclosure provides a display device including the touch and display control device, and an electronic system including the display device.

At least one example embodiment of the present disclosure provides a method of operating the display device.

According to example embodiments, a touch and display control device includes a touch screen controller and a display driver. The touch screen controller receives a touch sensing signal from a touch screen panel, generates touch raw data based on the touch sensing signal, and extracts touch coordinate information and first touch attribute information based on the touch raw data. The display driver receives an original image from a host processor, directly receives the touch coordinate information and the first touch attribute information from the touch screen controller, generates touch trajectory information by accumulating the touch coordinate information and the first touch attribute information, internally generates a touch image to be displayed together with the original image based on the touch trajectory information, generates a composite image by synthesizing the original image and the touch image, and controls a display panel to display the composite image. The display driver includes a memory storing the touch trajectory information.

According to example embodiments, a display device includes a touch screen panel, a display panel, and a touch and display control device. The touch screen panel detects a touch event. The display panel displays an original image and a touch image corresponding to the touch event. The touch and display control device controls operations of the touch screen panel and the display panel. The touch and display control device includes a touch screen controller and a display driver. The touch screen controller receives a touch sensing signal corresponding to the touch event from the touch screen panel, generates touch raw data based on the touch sensing signal, and extracts touch coordinate information and first touch attribute information based on the touch raw data. The display driver receives the original image from a host processor, directly receives the touch coordinate information and the first touch attribute information from the touch screen controller, generates touch trajectory information by accumulating the touch coordinate information and the first touch attribute information, internally generates the touch image to be displayed together with the original image based on the touch trajectory information, generates a composite image by synthesizing the original image and the touch image, and controls the display panel to display the composite image. The display driver includes a memory storing the touch trajectory information.

According to example embodiments, in a method of operating a display device, an original image is received by a display driver from a host processor. Touch coordinate information and first touch attribute information are extracted by a touch screen controller by detecting a touch event on a touch screen panel. The touch coordinate information and the first touch attribute information are directly received by the display driver from the touch screen controller without passing through the host processor. Touch trajectory information is generated by the display driver by accumulating the touch coordinate information and the first touch attribute information. The touch trajectory information is stored by the display driver in an internal memory. A touch image to be displayed together with the original image is internally generated by the display driver based on the touch trajectory information. A composite image is generated by the display driver by synthesizing the original image and the touch image. A display panel is controlled by the display driver to display the composite image.

According to example embodiments, an electronic system includes and a display device and a host processor configured to control the display device. The display device includes a touch screen panel, a display panel, and a touch and display control device. The touch screen panel detects a touch event. The display panel displays an original image and a touch image corresponding to the touch event together. The touch and display control device controls operations of the touch screen panel and the display panel. The touch and display control device includes a readout circuit, a touch coordinate calculator, a display controller, a memory, an image buffer, an image processor and a source driver. The readout circuit receives a touch sensing signal corresponding to the touch event from the touch screen panel, and generates touch raw data based on the touch sensing signal. The touch coordinate calculator extracts touch coordinate information and first touch attribute information based on the touch raw data. The display controller directly receives the touch coordinate information and the first touch attribute information from the touch coordinate calculator without passing through the host processor, receives the original image and second touch attribute information from the host processor, and generates touch trajectory information by accumulating the touch coordinate information, the first touch attribute information and the second touch attribute information. The memory stores the touch trajectory information. The image buffer stores the original image. The image processor internally generates the touch image to be displayed together with the original image based on the touch trajectory information, and generates a composite image by synthesizing the original image and the touch image. The source driver generates a plurality of data voltages provided to the display panel based on the composite image. The touch coordinate information and the first touch attribute information are not transmitted from the touch coordinate calculator to the host processor. The touch image is not generated by the host processor, and is generated by the touch and display control device. When the original image is a still image, the host processor enters a power-down mode after the host processor transmits the original image to the touch and display control device. The touch and display control device transmits the touch trajectory information stored in the memory to the host processor periodically or depending on a state of the memory or when a request is received from the host processor.

In the touch and display control device, the display device, the electronic system and the method of operating the display device according to example embodiments, it may be implemented to include the display controller that generates the touch trajectory information, the memory that stores the touch trajectory information, and the image synthesizer that generates the touch image and the composite image. The touch coordinate information may be directly provided to the display controller without passing through the host processor, and the touch image and the composite image may be internally self-generated using the touch trajectory information including the touch coordinate information and the touch attribute information.

According to example embodiments, a method of displaying an image includes receiving an original image from a host processor, detecting a touch event, transmitting touch event information from a touch screen controller to a display driver using a transmission path that excludes the host processor, generating a composite image using the display driver based on the original image and the touch event information, and displaying the composite image in response to the touch event.

Accordingly, the touch responsiveness may be remarkably improved or enhanced by removing a time during which the images are processed and generated by the host processor. In addition, when only the touch image is reflected without changing the original image, such as writing on a note, the image processing may be performed by only the display driver. Accordingly, the power consumption for image processing, generation, synthesis, etc. by the operation of the display control path of the host processor may also be reduced.

BRIEF DESCRIPTION OF THE DRAWINGS

Illustrative, non-limiting example embodiments will be more clearly understood from the following detailed description taken in conjunction with the accompanying drawings.

FIG. 2 is a block diagram illustrating an example of a touch and display control device, a display device and an electronic system of FIG. 1.

FIGS. 3A, 3B, 3C and 3D are diagrams for describing operations of a touch and display control device, a display device and an electronic system of FIG. 2.

FIGS. 4A and 4B are diagrams for describing an operation of generating and storing touch trajectory information in a touch and display control device according to example embodiments.

FIGS. 5A, 5B, 5C, 6, 7A, 7B, 7C and 8 are diagrams for describing operations of generating a touch image and a composite image in a touch and display control device according to example embodiments.

FIGS. 9A and 9B are diagrams for describing an operation of generating and storing touch trajectory information in a touch and display control device according to example embodiments.

FIG. 18 is a block diagram illustrating an electronic system according to example embodiments.

DETAILED DESCRIPTION OF THE EMBODIMENTS

Figure 1:
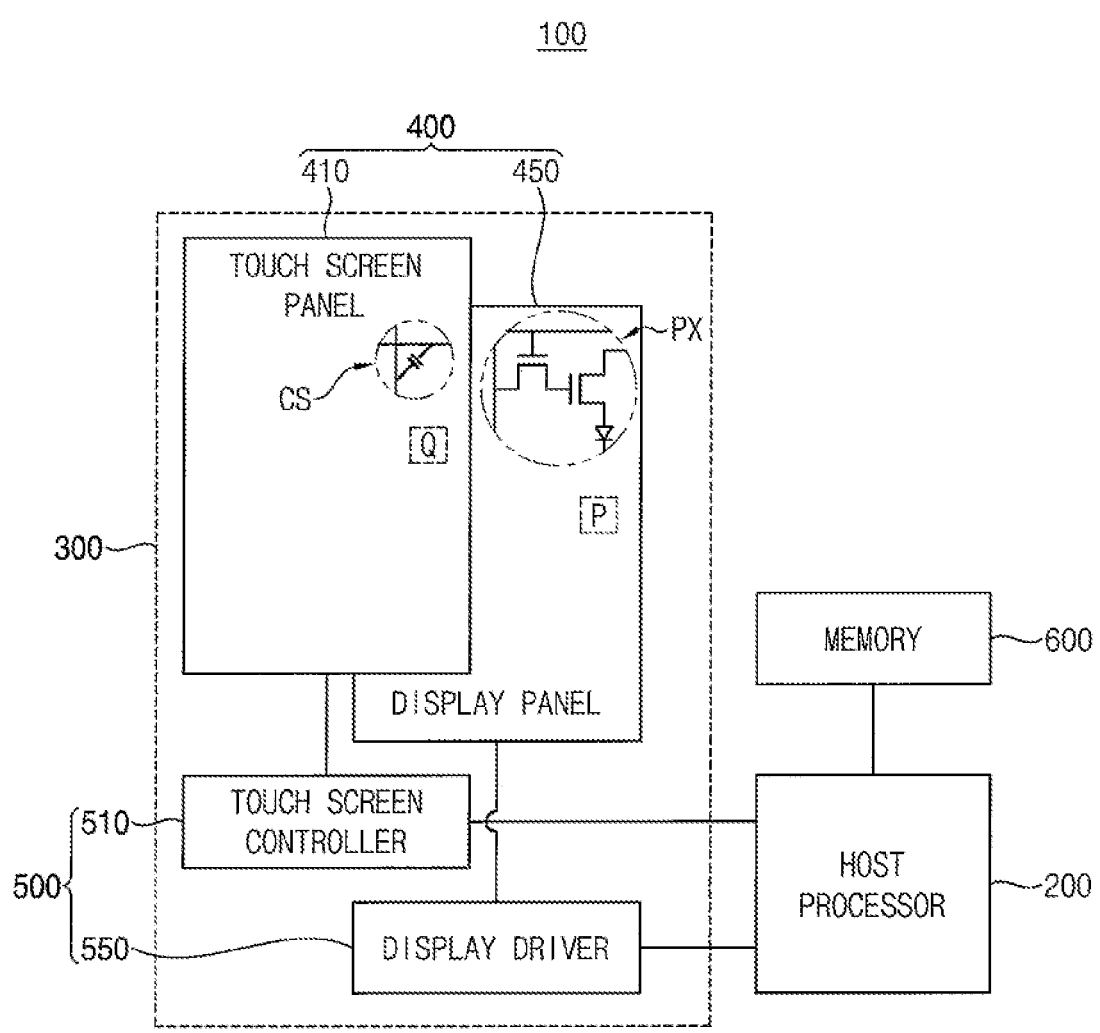
FIG. 1 is a block diagram illustrating a touch and display control device, a display device and an electronic system according to example embodiments.

The present disclosure relates generally to semiconductor integrated circuits, and more particularly to touch and display control devices with fast touch responsiveness. Embodiments of the present disclosure include touch and display control devices, methods of operating the display devices, and electronic systems including the display devices.

Embodiments of the present disclosure provide touch coordinate information directly to a display controller without passing through the host processor. Additionally, a touch image and a composite image may be generated by using touch trajectory information, where the touch trajectory information includes the touch coordinate information and touch attribute information.

During a writing function (e.g., using a finger or a stylus pen) delay time between a touch input and a display displaying the touch may be relatively high due to a long signal transmission path from a touch input to a display driver. For example the transmission path may pass through a host processor. The delay can interfere with the writing process and cause a poor writing experience for the user.

Accordingly, a touch screen controller of the present disclosure receives a touch sensing signal, generates touch raw data based on the touch sensing signal, and extracts touch information based on the touch raw data. The display driver of the present disclosure receives an original image from a host processor, directly receives the touch information from the touch screen controller, generates touch trajectory information by accumulating the touch information, internally generates a touch image to be displayed with the original image based on the touch trajectory information, generates a composite image by synthesizing the original image and the touch image, and controls a display panel to display the composite image. The display driver includes a memory storing the touch trajectory information.

Various example embodiments will be described more fully with reference to the accompanying drawings, in which embodiments are shown. However, the present disclosure may be embodied in many different forms and should not be construed as limited to the embodiments set forth herein. Like reference numerals refer to like elements throughout the present disclosure.

FIG. 1 is a block diagram illustrating a touch and display control device, a display device, and an electronic system according to example embodiments.

Referring to FIG. 1, an electronic system 100 includes a host processor 200 and a display device 300. In some embodiments, the host processor 200 comprises an external host process that is located outside of the display device 300. The electronic system 100 may further include a memory 600.

The display device 300 is configured to display images based on controls from the host processor 200. According to embodiments of the present disclosure, the display device 300 is also configured to display internally generated images, or internally generated portions of an image. The display device 300 includes a panel 400 for interfacing with a user and a touch and display control device 500 for controlling the panel 400.

The panel 400 includes a touch screen panel 410 for sensing a touch input of the user and a display panel 450 for outputting visual information to the user. The electronic system 100 may display information output from the electronic system 100 through the panel 400. The user of the electronic system 100 may input a signal to the electronic device system through the panel 400. The touch screen panel 410 may be referred to as a touch sensor panel.

The touch screen panel 410 may sense contact or proximity of an object (e.g., a finger of the user or a stylus pen). The touch screen panel 410 may generate a sensing signal in response to the contact or proximity of the object. For example, the touch screen panel 410 may be implemented with a capacitive type and may include a plurality of sensing capacitors which are formed along rows and columns. FIG. 1 illustrates an example sensing capacitor CS. Capacitance values of the sensing capacitors may vary in response to the contact or proximity of the object. However, example embodiments are not limited thereto, and the touch screen panel 410 may be implemented with various types such as a resistive type, an optical type, an inductive type, an infrared (IR) type, a surface acoustic wave (SAW) type, or the like.

The display panel 450 may output visual information to the user. The display panel 450 may include a plurality of pixels which are arranged along rows and columns to display an image. FIG. 1 illustrates one example pixel PX. Each pixel may be configured to emit light of a specific color to form the image. As the plurality of pixels emit light together, the display panel 450 may display a desired or intended image.

In some example embodiments, the display panel 450 may be an electroluminescent display panel. The electroluminescent display panel may be driven with rapid response speed and low power consumption using a light-emitting diode (LED) or an organic light-emitting diode (OLED) that generates light by recombination of electrons and holes. However, example embodiments are not limited thereto and the display panel 450 may be any display panel implemented with various types.

Each coordinate on the touch screen panel 410 may be matched with each coordinate on the display panel 450. For example, the display panel 450 may display interface information on a specific area P. The user may contact or approach a specific area Q on the touch screen panel 410 to input a command through the displayed interface information. Herein, a coordinate of the specific area Q may be matched with a coordinate of the specific area P. Accordingly, contact or proximity on or to the specific area Q may be processed in association with the interface information displayed on the specific area P.

In some example embodiments, the touch screen panel 410 may be implemented separately from the display panel 450. For example, as illustrated in FIG. 1, the touch screen panel 410 may be placed on or over the display panel 450. However, example embodiments are not limited thereto. For another example, unlike the illustration of FIG. 1, the display panel 450 may be placed on or over the touch screen panel 410. Alternatively, the touch screen panel 410 and the display panel 450 may be implemented in one single panel.

The touch and display control device 500 includes a touch screen controller 510 to control the touch screen panel 410, and a display driver 550 to control the display panel 450.

The touch screen controller 510 may control an operation of the touch screen panel 410. The touch screen controller 510 may process an operation associated with the contact or proximity of the object based on the sensing signal output from the touch screen panel 410. For example, the touch screen controller 510 may recognize the contact or proximity of the object based on variation in the capacitance values of the sensing capacitors. For example, when the sensing signal is associated with execution or operation of a specific application, the touch screen controller 510 may output a command or touch information to the host processor 200 such that the specific application is to be executed or to operate.

The display driver 550 may control an operation of the display panel 450 and may drive the display panel 450. For example, the display driver 550 may suitably drive each pixel of the display panel 450 in response to the command of the host processor 200 such that the desired or intended image is displayed on the display panel 450.

A detailed configuration and operation of the touch and display control device 500 according to example embodiments, e.g., configurations and operations of the touch screen controller 510 and the display driver 550 will be described with reference to FIGS. 2 through 12.

In some example embodiments, the touch and display control device 500 may be formed of or implemented as a single chip or two or more separate chips. A chip configuration of the touch and display control device 500 will be described with reference to FIGS. 2, 11, and 12.

The host processor 200 may control the overall operations of the electronic system 100. The host processor 200 may process/perform various arithmetic/logical operations to provide functions of the electronic system 100.

The host processor 200 may communicate with the touch screen controller 510, the display driver 550, and the memory 600. The host processor 200 may control operations of the touch screen controller 510, the display driver 550, and the memory 600. The host processor 200 may process commands, requests, responses, and/or the like. The commands may be associated with operations of the touch screen controller 510, the display driver 550, and the memory 600.

For example, the host processor 200 may process a command received from the touch screen controller 510 to determine a user command input through the touch screen panel 410. For example, the host processor 200 may provide information to the display driver 550 to display the desired or intended image on the display panel 450. For example, the host processor 200 may store associated or related data in the memory 600 or may load the associated data from the memory 600.

In some example embodiments, the host processor 200 may include one or more special-purpose circuits (e.g., a field programmable gate array (FPGA), application-specific integrated chips (ASICs), and/or the like) to perform various operations. For example, the host processor 200 may include one or more processor cores capable of performing various operations. For example, the host processor 200 may be implemented with a general-purpose processor (e.g., a central processing unit (CPU)), a special-purpose processor, or an application processor (AP).

The memory 600 may store data associated with or related to the operation of the electronic system 100. In some example embodiments, the memory 600 may include at least one of various volatile memories such as a dynamic random access memory (DRAM), a static random access memory (SRAM), or the like. In some example embodiments, the memory 600 may include at least one of various nonvolatile memories such as a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), or the like.

In some example embodiments, the touch screen controller 510, the display driver 550, the host processor 200, and the memory 600 may be respectively implemented with separate circuits/modules/chips. In other example embodiments, based on a function, some of the touch screen controller 510, the display driver 550, the host processor 200, and the memory 600 may be combined into one circuit/module/chip, or may be further separated into a plurality of circuits/modules/chips.

In some example embodiments, the electronic system 100 may be or include any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, or the like.

According to example embodiments, a method of displaying an image includes receiving an original image from the host processor 200, detecting a touch event at the touch screen controller 510, transmitting touch event information from the touch screen controller 510 to the display driver 550 using a transmission path that excludes the host processor 200, generating a composite image using the display driver 550, based on the original image and the touch event information, and displaying the composite image in response to the touch event.

In some examples, the touch event information includes touch coordinate information and touch attribute information. In some examples, the method further includes generating touch trajectory information using the display driver, wherein the composite image is generated based on the touch trajectory information. In some examples, the method further includes transmitting the touch trajectory information to the host processor. In some examples, the method further includes generating a touch image based on the touch event information and combining the touch image and the original image to produce the composite image.

FIG. 2 is a block diagram illustrating an example of a touch and display control device, a display device, and an electronic system of FIG. 1. The descriptions repeated with FIG. 1 will be omitted.

Referring to FIG. 2, an electronic system 100a includes a host processor 200, a display device and a memory 600. The display device includes a panel that includes a touch screen panel 410 and a display panel 450. The display device also includes a touch and display control device that includes a touch screen controller 510a and a display driver 550a.

An example of FIG. 2 will be described focusing on a configuration and operation of the touch and display control device with the touch screen controller 510a and the display driver 550a. FIG. 2 illustrates an example where the touch screen controller 510a and the display driver 550a are formed of or implemented as one chip. The host processor 200, the touch screen panel 410, the display panel 450, and the memory 600 may be substantially the same as those described with reference to FIG. 1.

The touch screen controller 510a receives a touch sensing signal TSEN from the touch screen panel 410, generates touch raw data TRDAT based on the touch sensing signal TSEN, and extracts touch coordinate information TCOOR and first touch attribute information TA1 based on the touch raw data TRDAT.

The touch screen controller 510a may include a readout circuit 520 and a touch coordinate calculator 530.

The readout circuit 520 may receive the touch sensing signal TSEN, and may generate the touch raw data TRDAT based on the touch sensing signal TSEN. The touch sensing signal TSEN may be an analog signal, and the touch raw data TRDAT may be digital data. For example, when a touch event TE occurs on the touch screen panel 410, the readout circuit 520 may receive the touch sensing signal TSEN from the touch screen panel 410. For example, the touch event TE may include a writing function in which a phrase such as "Here is Heaven!" is written on the touch screen panel 410 using a stylus pen 110. However, example embodiments are not limited thereto, and the touch event TE may include any touch event using any object.

The touch coordinate calculator 530 may extract the touch coordinate information TCOOR and the first touch attribute information TA1 based on the touch raw data TRDAT. For example, the touch coordinate information TCOOR may represent coordinate information (e.g., location information) on the touch screen panel 410 corresponding to the touch event TE. For example, the first touch attribute information TA1 may include at least one of a shape, a size, a direction, and a writing pressure associated with the touch event TE.

The display driver 550*a* receives an original image OIMG from the host processor 200, directly receives the touch coordinate information TCOOR and the first touch attribute information TA1 from the touch controller 510*a*, generates touch trajectory information TTRAJ by accumulating the touch coordinate information TCOOR and the first touch attribute information TA1, stores the touch trajectory information TTRAJ, internally generates a touch image TIMG to be displayed together with the original image OIMG based on the touch trajectory information TTRAJ, generate a composite image CIMG by synthesizing the original image OIMG and the touch image TIMG, and controls the display panel 450 to display the composite image CIMG.

According to embodiments of the present disclosure, when the display driver 550*a* receives the touch coordinate information TCOOR and the first touch attribute information TA1 from the touch screen controller 510*a*, it receives the information via a transmission path that excludes the host processor 200. By receiving the touch coordinate information TCOOR and the first touch attribute information TA1 directly (i.e., not via the processor), a time period for processing the touch coordinate information TCOOR and the first touch attribute information TA1 and generating a display change may be reduced.

The display driver 550*a* may further receive the second touch attribute information TA2 different from the first touch attribute information TA1 from the host processor 200 and may further output the touch trajectory information TTRAJ to the host processor 200.

The display driver 550*a* may include a memory 560, a display controller 570, an image processor 580, and a source driver 590. The display driver 550*a* may further include an image buffer 562 and an interface (or a display interface) 572.

The interface 572 may be an interface for communicating with the host processor 200. For example, the interface 572 may be a display serial interface (DSI) included in a mobile industry processor interface (MIPI). However, example embodiments are not limited thereto, and the interface 572 may be any interface implemented with various schemes.

The display driver 550*a* may receive the original image OIMG and may further receive the second touch attribute information TA2 from the host processor 200 through the interface 572. Additionally, or alternatively, the display driver 550*a* may transmit or provide the touch trajectory information TTRAJ to the host processor 200 through the interface 572 periodically or based on a request from the host processor 200. Additionally, or alternatively, the display driver 550*a* may transmit or provide the touch trajectory information TTRAJ to the host processor 200 through the interface 572, depending on a state of the memory 560. For example, when the memory 560 is full, the display driver 550*a* may transmit the touch trajectory information TTRAJ to the host processor 200, the host processor 200 may generate a composite image reflecting the touch trajectory so far and may transmit the composite image to the display driver 550*a* as a second original image, and the display driver 550*a* may synthesize the second original image and additional touch trajectory formed thereafter. As a result, there may be no problem in the continuity of handwriting (e.g., in a case where a large amount of handwriting continues to be written on the entire screen without changing an operation mode).

The display controller 570 may control the overall operations of the display driver 550*a*. The display controller 570 may directly receive the touch coordinate information TCOOR and the first touch attribute information TA1 from the touch screen controller 510*a*, may generate the touch trajectory information TTRAJ by accumulating the touch coordinate information TCOOR and the first touch attribute information TA1, and may transmit or provide the touch trajectory information TTRAJ to the memory 560. In some example embodiments, when the second touch attribute information TA2 is further received, the display controller 570 may generate the touch trajectory information TTRAJ by accumulating the touch coordinate information TCOOR, the first touch attribute information TA1, and the second touch attribute information TA2. For example, the second touch attribute information TA2 may include at least one of a tool and a color defined for the touch event TE.

The memory 560 may store the touch trajectory information TTRAJ received from the display controller 570. For example, the touch trajectory information TTRAJ may be provided and stored in the form of a table. The memory 560 may be referred to as a memory for storing touch trajectory. A configuration of the touch trajectory information TTRAJ will be described in detail with reference to FIGS. 4 and 9.

In some example embodiments, the memory 560 may include at least one of various volatile memories such as a dynamic random access memory (DRAM), a static random access memory (SRAM), or the like, and/or at least one of various nonvolatile memories such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), or the like. Alternatively, the memory 560 may include any register, buffer, or the like.

The image buffer 562 may store the original image OIMG received from the host processor 200. For example, the image buffer 562 may store the entire or partial image to be displayed in a compressed or uncompressed state. For example, the image buffer 562 may include at least one frame buffer and/or line buffer, or may include a SRAM, a register, or the like. The image buffer 562 may be referred to as an image buffer for display. In some example embodiments, the image buffer 562 may be omitted.

The image processor 580 may internally generate the touch image TIMG based on the touch trajectory information TTRAJ, and may generate the composite image CIMG by synthesizing the original image OIMG and the touch image TIMG.

The image processor 580 may include a first processing unit 582, an image synthesizer 584 and a second processing unit 586.

The first processing unit 582 may be disposed at the front end of the image synthesizer 584, and may perform pre-processing on the original image OIMG. The first processing unit 582 may be referred to as a pre-processing unit. For example, when the original image OIMG is a compressed image, the first processing unit 582 may perform an operation of decompressing the compressed image. For another example, when the original image OIMG does not match a resolution of the display panel 450, the first processing unit 582 may perform an operation of adjusting (e.g., up/down scaling) a resolution of the original image OIMG. However, example embodiments are not limited thereto, and the first processing unit 582 may perform various other pre-processing operations.

The image synthesizer 584 may internally generate the touch image TIMG based on the touch trajectory information TTRAJ. The image synthesizer 584 may also generate the composite image CIMG by synthesizing the original image OIMG and the touch image TIMG. In some example embodiments, the operation of generating the touch image TIMG may be performed first, and then the operation of generating the composite image CIMG may be performed later. In other example embodiments, the operation of generating the touch image TIMG and the operation of generating the composite image CIMG may be performed substantially simultaneously or concurrently (or at once). The operation of synthesizing images will be described in detail with reference to FIGS. 5 through 8.

The second processing unit 586 may be disposed at the rear end of the image synthesizer 584, and may perform post-processing on the composite image CIMG. The second processing unit 586 may be referred to as a post-processing unit. For example, the second processing unit 586 may perform functions for reinforcing or supplementing analog characteristics of the display panel 450. For example, the second processing unit 586 may perform a function of compensating for voltage drop (or IR drop), a function of compensating for Mura (or a function of Demura), a function of compensating for a threshold voltage of a driving transistor in a pixel, or the like. However, example embodiments are not limited thereto, and the second processing unit 586 may perform various other post-processing operations.

Although FIG. 2 illustrates the image processor 580 with two processing units 582 and 586 disposed at the front and rear ends of the image synthesizer 584, but example embodiments are not limited thereto. The number and arrangement of processing units included in the image processor 580 may be changed according to example embodiments.

The source driver 590 may generate a plurality of data voltages VD provided to the display panel 450 based on the composite image CIMG. The composite image CIMG may be displayed on the display panel 450 based on the plurality of data voltages VD.

Although not illustrated in FIG. 2, the display driver 550*a* may further include a scan driver (or gate driver), a gamma circuit, or the like.

FIGS. 3A, 3B, 3C and 3D are diagrams for describing operations of a touch and display control device, a display device and an electronic system of FIG. 2. The descriptions repeated with FIG. 1 will be omitted.

Referring to FIG. 3A, the touch and display control device may receive the original image OIMG from the host processor 200 when the original image OIMG is displayed on the display panel 450. The display controller 570 may manage timings and may control commands for components included in the display driver 550*a* to display the original image OIMG.

When the touch event TE occurs while the original image OIMG is displayed, the display controller 570 may directly receive the touch coordinate information TCOOR and the first touch attribute information TA1 from the touch screen controller 510*a*, may receive the second touch attribute information TA2 received from the host processor 200, may generate the touch trajectory information TTRAJ based on the touch coordinate information TCOOR, the first touch attribute information TA1 and the second touch attribute information TA2, and may store the touch trajectory information TTRAJ in the memory 560. The image synthesizer 584 may generate the touch image TIMG, and may generate the composite image CIMG by synthesizing the original image OIMG and the touch image TIMG. The display controller 570 may manage timings and may control commands for the components included in the display driver 550*a* to display the composite image CIMG.

When the touch event TE occurs in the display device according to example embodiments, the touch coordinate information TCOOR and the first touch attribute information TA1 may not be transmitted from the touch screen controller 510*a* to the host processor 200. Therefore, the touch image TIMG may not be generated by the host processor 200 and may be internally and/or self-generated by the display driver 550*a*. However, example embodiments are not limited thereto. For example, in a normal operation mode that may be different from the operation mode of the example embodiments, the touch coordinate and the touch attribute may be transmitted from the touch screen controller to the host processor, and/or the operation of generating the touch image in the display driver may be performed simultaneously or in parallel with the operation of generating the touch image in the host processor.

Figure 3B:
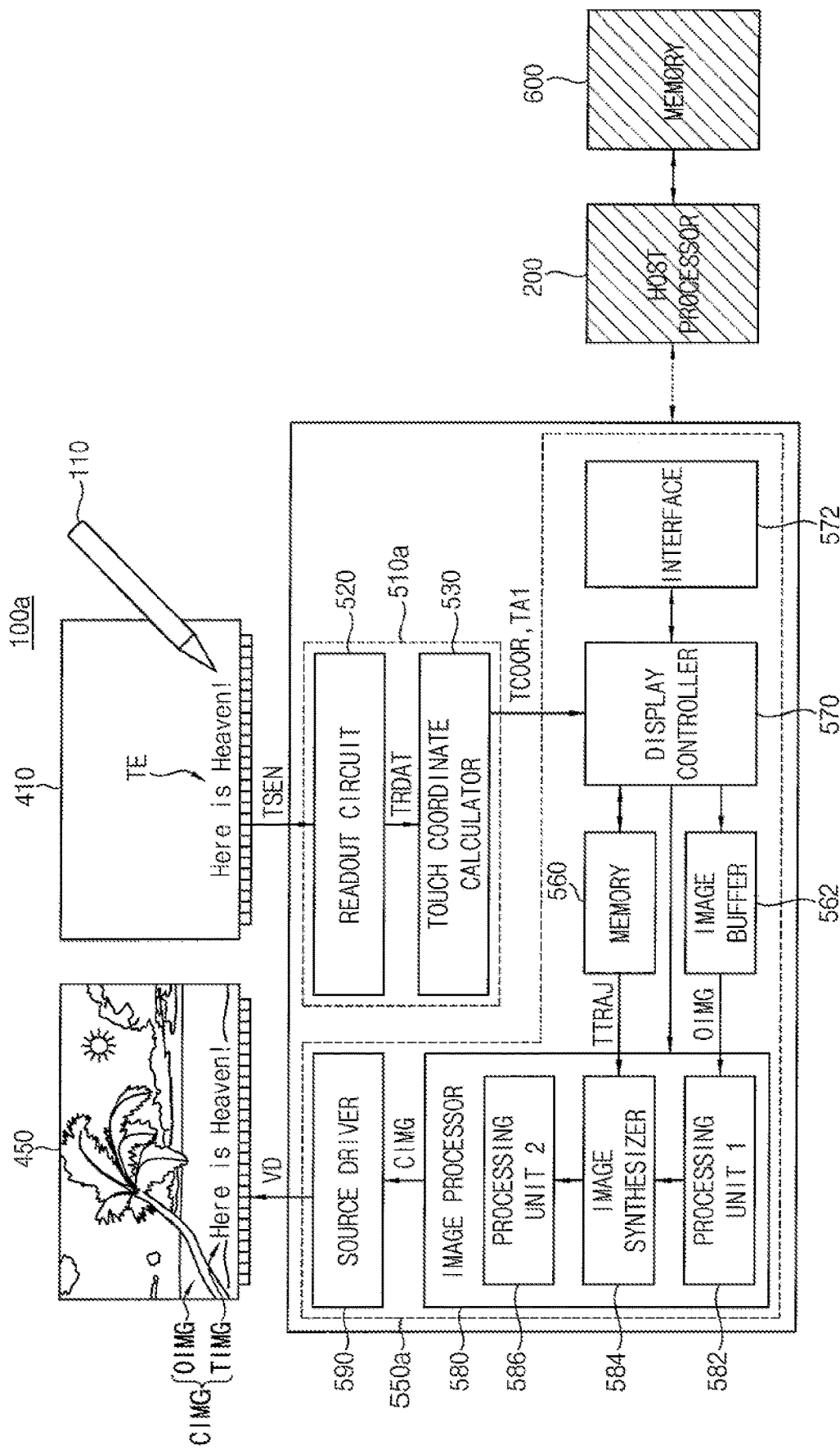

Referring to FIG. 3B, when the original image OIMG is a still image (or a stopped image or static image), continuously transmitting the original image OIMG from the host processor 200 to the display driver 550*a* may not be performed. Therefore, the host processor 200 may enter a power-down mode after the host processor 200 transmits the original image OIMG to the display driver 550*a* at an initial operation time. Additionally, or alternatively, the memory 600 that exchanges data with the host processor 200 may also enter the power-down mode. In FIG. 3B, the hatched components may be representative of the power-down mode.

The power-down mode may be referred to as an idle mode, a sleep mode, a power saving mode, etc. The power-down mode may represent an operation mode in which operations of the host processor 200 and the memory 600 are stopped to reduce power consumption of the host processor 200 and the memory 600. The display driver 550*a* may display an image using the original image OIMG stored in the image buffer 562 in the power-down mode. In other words, in the power-down mode, image processing may be performed using the display driver 550*a*. In some examples, the host processor 200 and the memory 600 do not perform operations associated with the image processing.

In the present disclosure, the term "power-down mode" may represent an operation mode in which the power consumption is reduced for the operations associated with the image processing. When operations other than the image processing are to be performed by the electronic system 100*a*, the host processor 200 and the memory 600 may be enabled or activated to perform corresponding operations.

Figure 3D:
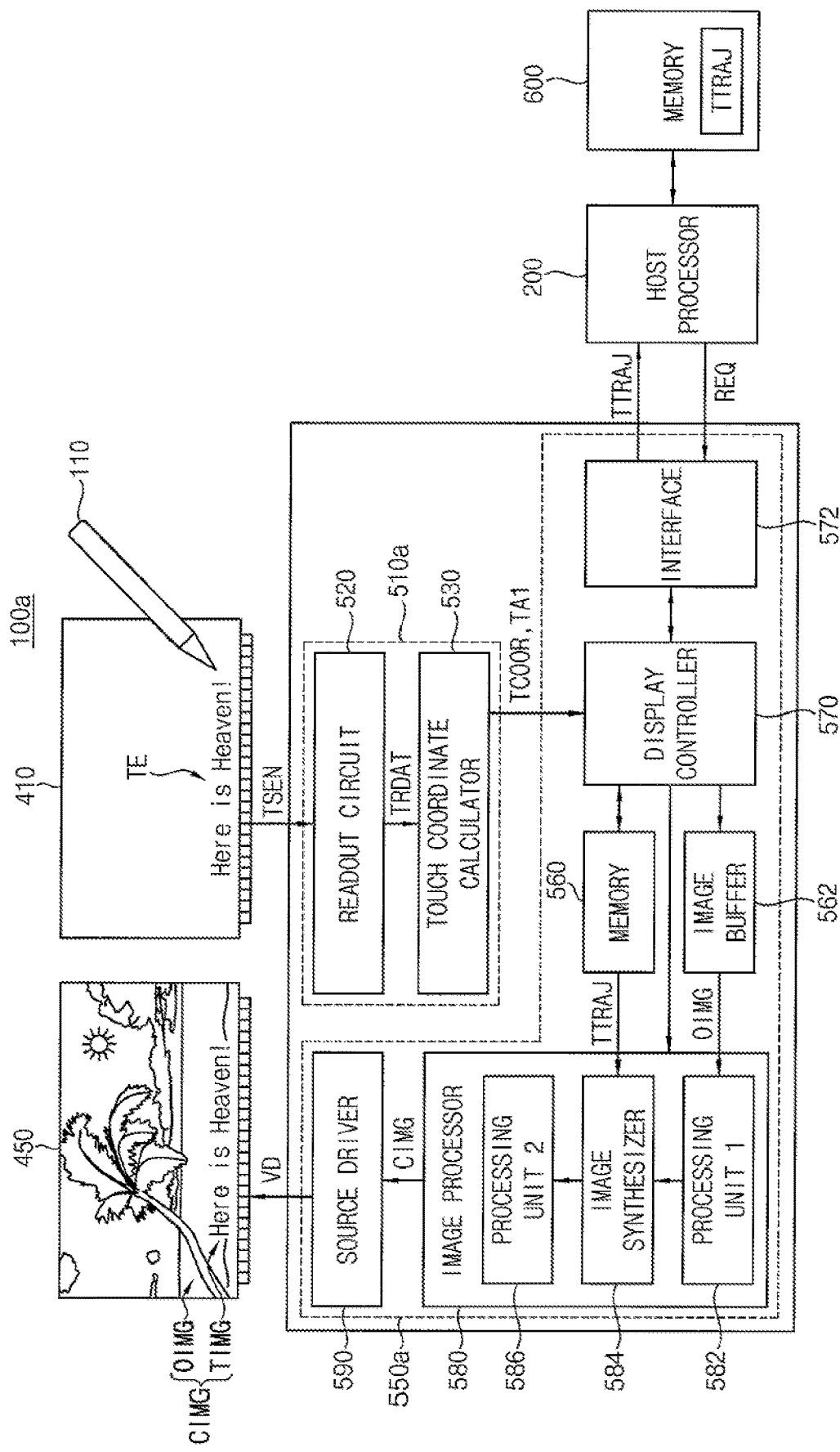

Referring to FIGS. 3C and 3D, the display driver 550*a* may transmit the touch trajectory information TTRAJ stored in the memory 560 to the host processor 200. The touch trajectory information TTRAJ transmitted to the host processor 200 may be transmitted to the memory 600 and may be stored in the memory 600. The image displayed on the display panel 450 may be notified to the host processor 200. Therefore, appropriate image processing may be performed such that the image displayed and an image that will be generated by the host processor 200 and generated by reflecting complex graphic features based on the touch trajectory information TTRAJ do not contradict or mismatch each other.

In some example embodiments, as illustrated in FIG. 3C, the display driver 550*a* may transmit the touch trajectory information TTRAJ to the host processor 200 without a request from the host processor 200. For example, the display driver 550*a* may transmit the touch trajectory information TTRAJ to the host processor 200 periodically or regularly or depending on the state of the memory 560. For example, although not illustrated in FIG. 3C, the display driver 550*a* may include a timer or a counter for setting a period or interval of transmitting the touch trajectory information TTRAJ.

In other example embodiments, as illustrated in FIG. 3D, the display driver 550*a* may transmit the touch trajectory information TTRAJ to the host processor 200 when a request REQ from the host processor 200 is received. For example, when an operation mode of the electronic system 100*a* is changed or when a mode of an application executed by the electronic system 100*a* is changed, the host processor 200 may generate the request REQ, and the touch trajectory information TTRAJ may be transmitted from the memory 560 to the host processor 200.

The touch and display control device, according to example embodiments, may include the display controller 570 that generates the touch trajectory information TTRAJ, the memory 560 that stores the touch trajectory information TTRAJ, and the image synthesizer 584 that generates the touch image TIMG and the composite image CIMG. The touch coordinate information TCOOR may be directly provided to the display controller 570 without passing through the host processor 200. The touch image TIMG and the composite image CIMG may be internally and/or self generated by using the touch trajectory information TTRAJ with the touch coordinate information TCOOR and the touch attribute information TA1 and TA2. Accordingly, the touch responsiveness may be remarkably improved or enhanced by removing a time during which the images are processed and generated by the host processor 200. Additionally, or alternatively, when the touch image TIMG is reflected without changing the original image IMG, such as writing on a note, the image processing may be performed by the display driver 550*a*. Accordingly, the power consumption for image processing, generation, synthesis, etc. by the operation of the display control path of the host processor 200 may also be reduced.

Figure 4A:
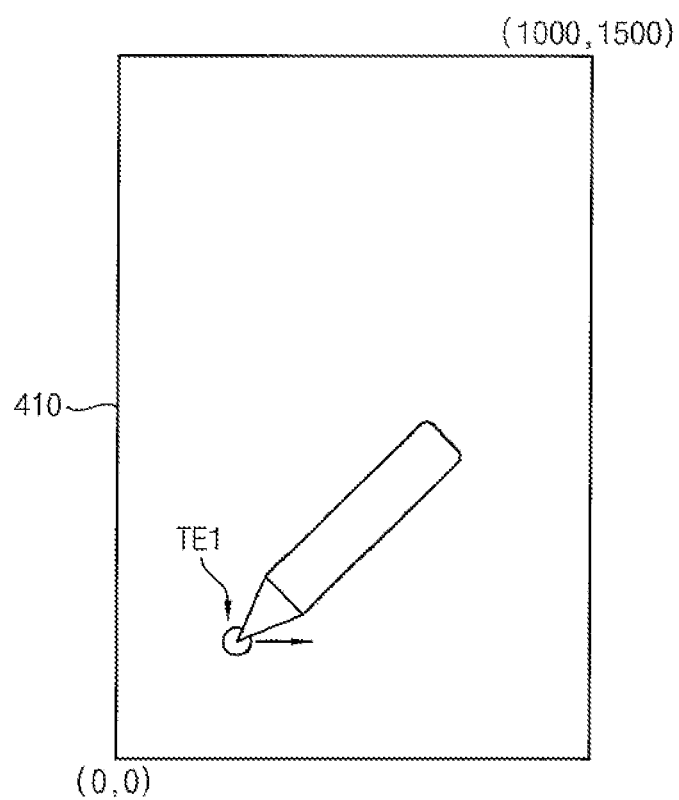

FIGS. 4A and 4B are diagrams for describing an operation of generating and storing touch trajectory information in a touch and display control device according to example embodiments.

Referring to FIG. 4A, an example in which a first touch event TE1 occurs on the touch screen panel 410 is illustrated. The first touch event TE1 may represent that a first object moves to the right.

Each location of the touch screen panel 410 may have a coordinate. For example, a coordinate at the lower-left corner of the touch screen panel 410 may be (0,0), and a coordinate at the upper right corner of the touch screen panel 410 may be (1000,1500).

Referring to FIG. 4B, the touch trajectory information TTRAJ stored in the memory 560 and corresponding to the first touch event TE1 in FIG. 4A is illustrated. The touch trajectory information TTRAJ may be generated by accumulating and storing the touch coordinate information TCOOR, and the first touch attribute information TA1 extracted from the touch coordinate calculator 530 in time (e.g., according to an order of time), and by accumulating and storing the second touch attribute information TA2 received from the host processor 200 in time. For example, the order of time may represent an order of image frames. For example, the touch coordinate information TCOOR may represent coordinates for X, Y, and Z axes.

In some example embodiments, the first touch attribute information TA1 may include a shape, a size, a direction (or angle), and a writing pressure associated with the first touch event TE1, and the second touch attribute information TA2 may include a tool and a color defined for the first touch event TE1. For example, the first touch event TE1 may represent an action of drawing a line in black with a pencil using a 4*4 circular pointer. However, example embodiments are not limited thereto, and the touch attribute information TA1 and TA2 may further include more complex and various functions such as a gradation effect and a shadow effect for the color.

FIGS. 5A, 5B, 5C, 6, 7A, 7B, 7C, and 8 are diagrams for describing operations of generating a touch image and a composite image in a touch and display control device according to example embodiments.

Figure 5B:
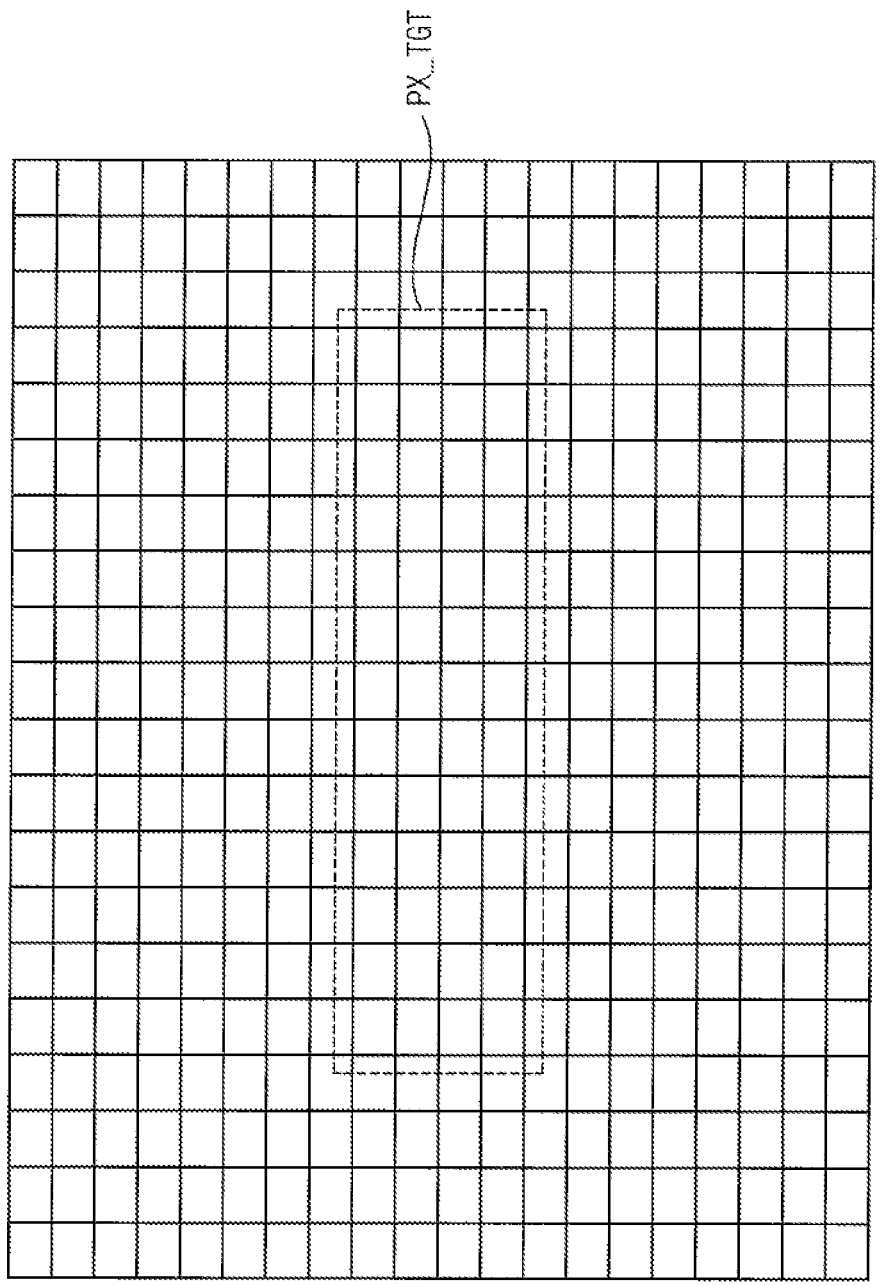
Figure 5C:
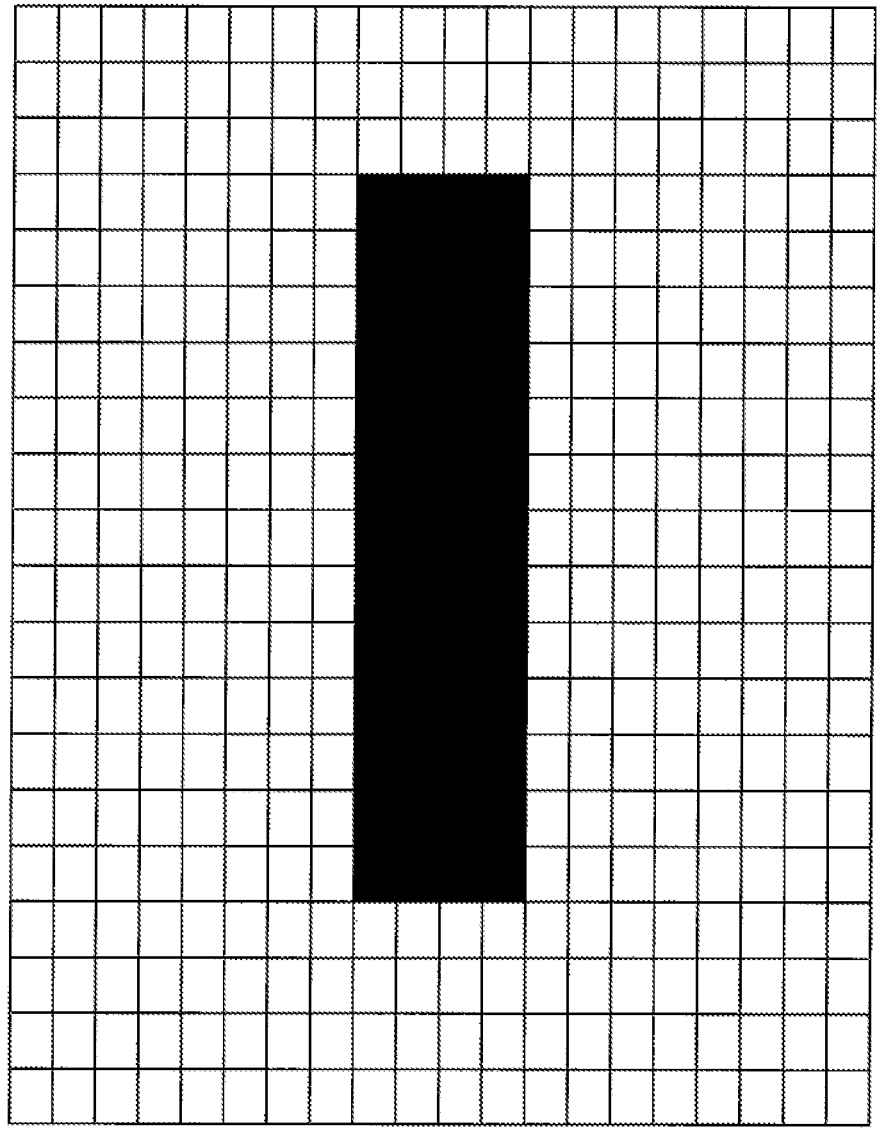

Referring to FIGS. 5A, 5B, and 5C, an example of generating a first touch image TIMG1 for the first touch event TE1 in FIGS. 4A and 4B is illustrated. In the example of FIGS. 5A, 5B, and 5C, the first touch image TIMG1 may be generated first, and then the first touch image TIMG1 and a first original image are synthesized later.

As illustrated in FIG. 5A, first pixels PX_T may be set based on the touch coordinate information TCOOR included in the touch trajectory information TTRAJ. For example, the first pixels PX_T corresponding to the coordinates in FIG. 4B may be selected from an empty image or screen (e.g., an image without any pixel values).

As illustrated in FIG. 5B, first target pixels PX_TGT associated with the first touch image TIMG1 may be set based on the touch coordinate information TCOOR and the first touch attribute information TA1 included in the touch trajectory information TTRAJ. Each of the first pixels PX_T in FIG. 5A may represent a pixel corresponding to a touch coordinate. The first touch image TIMG1 may be generated in consideration of the shape, the size, the direction and the writing pressure of the first touch event TE1. Therefore, the first target pixels PX_TGT may be selected by reflecting the first touch attribute information TA1 corresponding to the coordinates in FIG. 4B.

As illustrated in FIG. 5C, the first touch image TIMG1 may be generated by setting pixel data of the first target pixels PX_TGT based on the second touch attribute information TA2 included in the touch trajectory information TTRAJ. For example, the first touch event TE1 may represent an action of drawing a line in black with a pencil. Therefore, the first touch image TIMG1 may be obtained by reflecting the second touch attribute information TA2 corresponding to the coordinates in FIG. 4B.

In other words, when generating the first touch image TIMG1, a range of the pixels to be converted may be set first based on the touch coordinates. For example, the number of pixels to be changed in the left, right, up, and down directions from the touch coordinates may be determined based on the thickness and shape of the handwriting. The pixel data may then be set by determining which state of the pixels to be changed. For example, the most dominant feature may be the attribute for the color, and the pixel data of a corresponding pixel may be set based on grayscale information of a corresponding color.

After the first touch image TIMG1 is generated as described above, the image synthesizer 584 may generate a first composite image by synthesizing the first touch image TIMG1 and the first original image. For example, the first touch image TIMG1 may be temporarily stored in a memory that may be different and separate from the image buffer 562. The first touch image TIMG1 may then be synthesized with the first original image by the image synthesizer 584.

Figure 6:
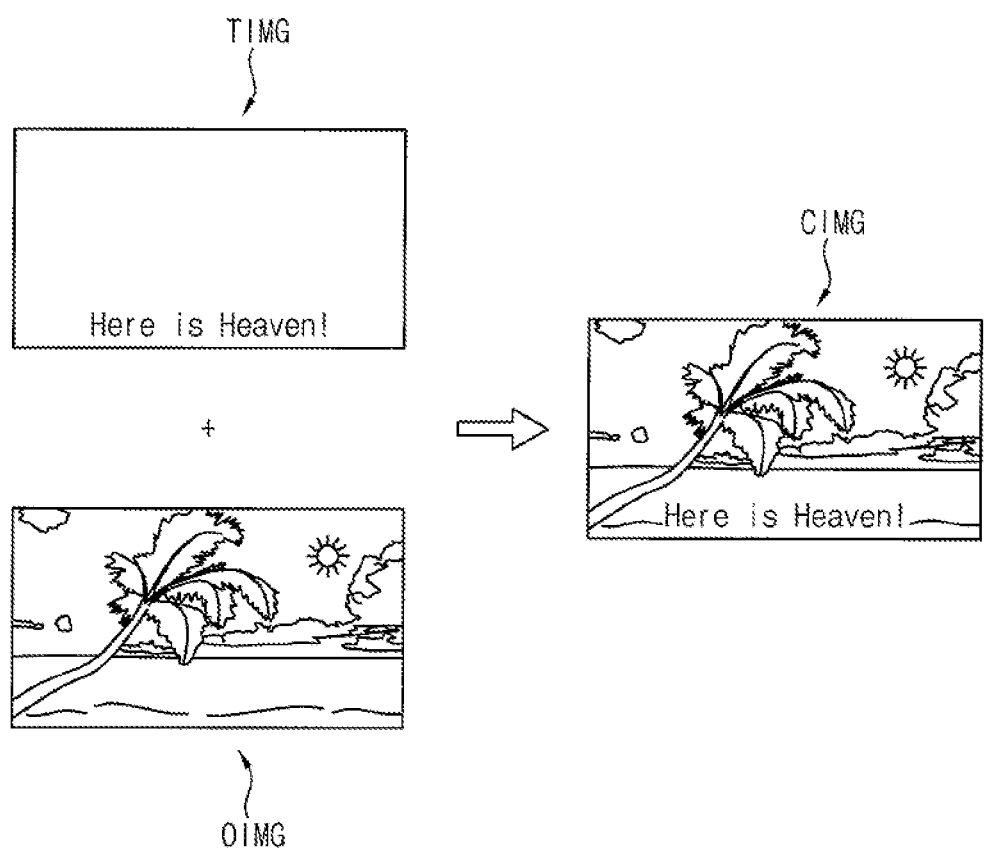

Referring to FIG. 6, an example of generating the composite image CIMG in FIG. 2 is illustrated. As with the example of FIGS. 5A, 5B and 5C, in the example of FIG. 6, the touch image TIMG corresponding to the touch event TE may be generated first, and then the composite image CIMG may be generated later by synthesizing the touch image TIMG and the original image OIMG. In other words, FIG. 6 illustrates the operations of generating the touch image, storing the touch image in a separate memory, and synthesizing the touch image with the original image.

Figure 7C:
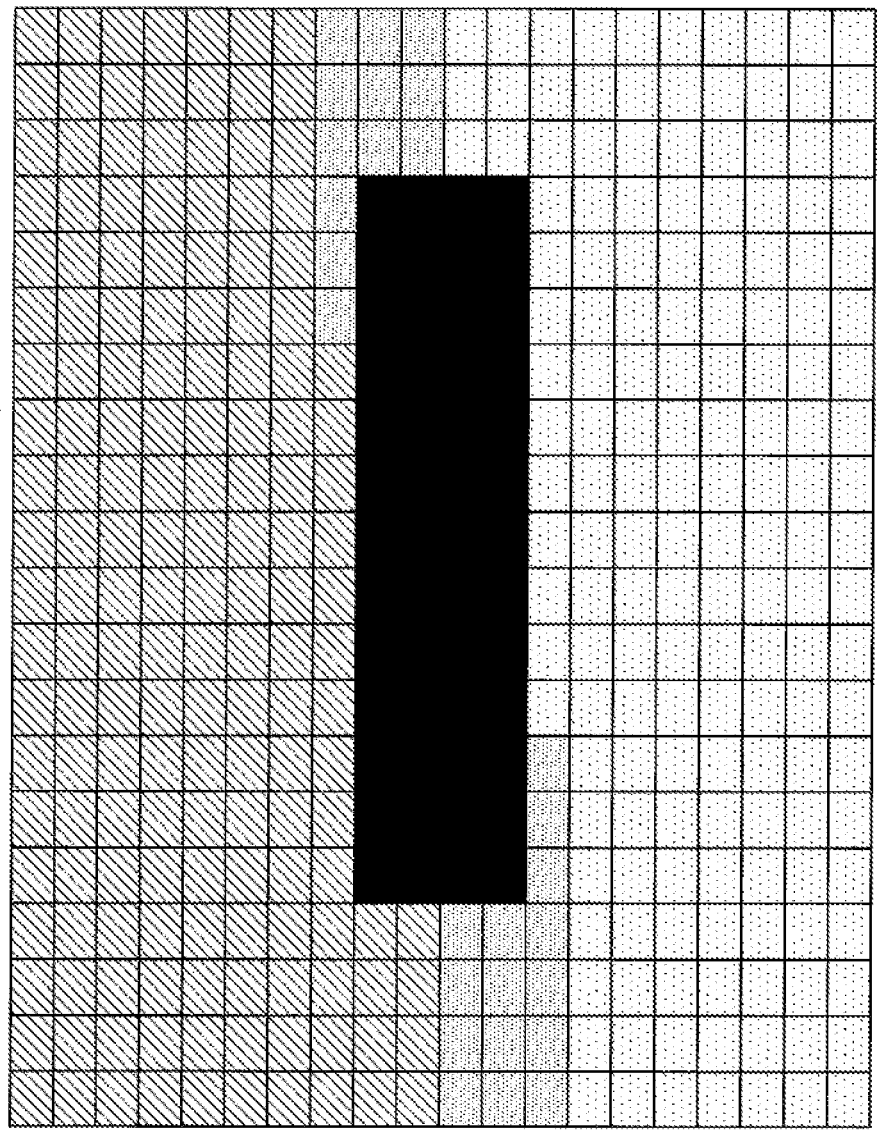

Referring to FIGS. 7A, 7B, and 7C, another example of generating a first touch image TIMG1 for the first touch event TE1 in FIGS. 4A and 4B is illustrated. In the example of FIGS. 7A, 7B, and 7C, the operation of generating the first touch image TIMG1 and the operation of generating a first composite image CIMG1 by synthesizing the first touch image TIMG1 and a first original image OIMG1 may be substantially simultaneously performed.

As illustrated in FIG. 7A, first pixels PX_T may be set in the first original image OIMG1 based on the touch coordinate information TCOOR included in the touch trajectory information TTRAJ. Next, as illustrated in FIG. 7B, first target pixels PX_TGT associated with the first touch image TIMG1 may be set in the first original image OIMG1 based on the touch coordinate information TCOOR and the first touch attribute information TA1 included in the touch trajectory information TTRAJ. Next, as illustrated in FIG. 7C, the first composite image CIMG1 may be generated by changing or setting pixel data of the first target pixels PX_TGT in the first original image OIMG1 based on the second touch attribute information TA2 included in the touch trajectory information TTRAJ.

Unlike the example of FIGS. 5A, 5B, and 5C in which the first touch image TIMG1 is generated first and the first touch image TIMG1 and the first original image are synthesized later by the image synthesizer 584, in the example of FIGS. 7A, 7B, and 7C, the image synthesizer 584 may change some pixel data of the first original image OIMG1 passing through the image buffer 562 and the first processing unit 582. Therefore, in the example of FIGS. 7A, 7B, and 7C, the operation of generating the touch image and the operation of synthesizing the images may be performed substantially simultaneously or at once.

Figure 8:
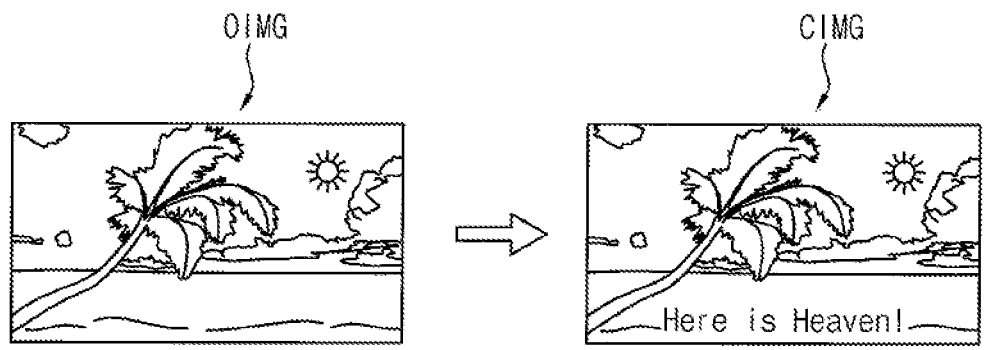

Referring to FIG. 8, another example of generating the composite image CIMG in FIG. 2 is illustrated. As with the example of FIGS. 7A, 7B, and 7C, in the example of FIG. 8, the image synthesizer 584 may generate the composite image CIMG by changing pixel data corresponding to the touch event TE in the original image OIMG. In other words, FIG. 8 illustrates that operations of generating the touch image and changing the pixel data of the original image passing through the image buffer 562 and the first processing unit are simultaneously performed. Signals corresponding to the composite image are then output to the source driver 590.

In some example embodiments, the operation of generating the touch image and the operation of synthesizing the images described with reference to FIGS. 5A, 5B, 5C, 6, 7A, 7B, 7C, and 8 may be performed by the image synthesizer 584. For example, the image synthesizer 584 may convert grayscale information of each pixel in the original image (or basic image) by reflecting the touch trajectory and attribute. The attributes or properties (e.g., writing tools such as a brush, pen, pencil, eraser, etc., image size, color, shadow effect, or the like) of the image to be combined may be provided and stored in advance. When the application wants to change the attributes of a corresponding function, the attributes may be received and stored again. Additionally, or alternatively, the image synthesizer 584 may have specific functions for generating various image characteristics. For example, the image synthesizer 584 may have a function of forming a handwriting thickness of about 2 to 3 pixels around the touch coordinates, a function of adding a gradation, and other more complex functions.

The operations of generating the composite image CIMG are not limited to the above-described examples, and may be changed according to example embodiments. For example, when the image buffer 562 has uncompressed data, the operations of generating the composite image CIMG may be implemented by storing the touch image directly to the image buffer 562. For another example, the operations of generating the composite image CIMG may be implemented by additionally disposing a second image buffer at the rear end of the second processing unit 586, by storing the composite image CIMG in the second image buffer, and by outputting signals corresponding to the composite image CIMG to the source driver 590 based on the second image buffer.

Figure 9A:
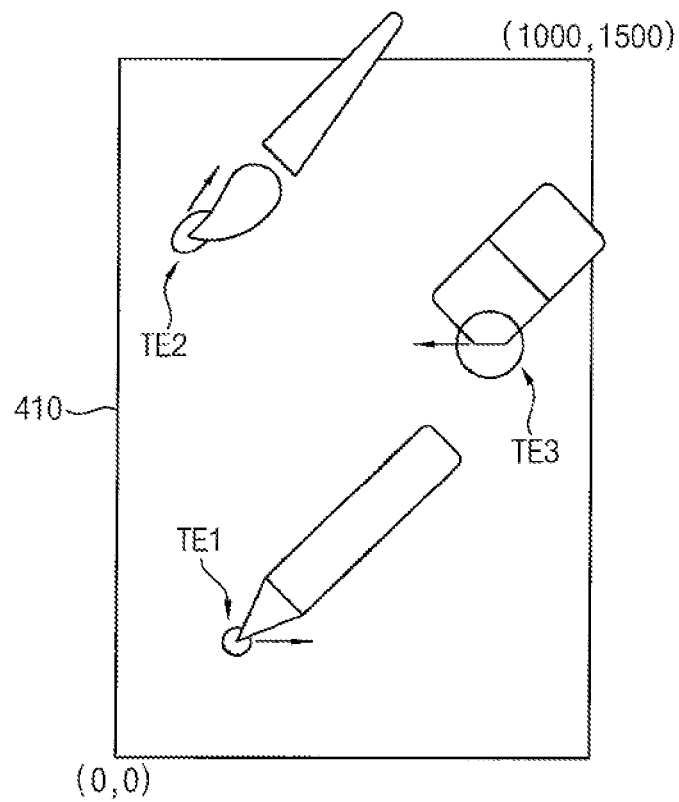

FIGS. 9A and 9B are diagrams for describing an operation of generating and storing touch trajectory information in a touch and display control device according to example embodiments. The descriptions repeated with FIGS. 4A and 4B will be omitted.

Referring to FIG. 9A, an example of a multi-touch situation (or environment) in which a plurality of touch events TE1, TE2, and TE3 occur on the touch screen panel 410 is illustrated. The first touch event TE1 may be substantially the same as the first touch event TE1 in FIG. 4A. The second touch event TE2 may represent that a second object moves in a diagonal direction toward the upper right. The third touch event TE3 may represent that a third object moves to the left.

In some examples, multiple touch events may be interpreted as a single event (e.g., when two fingers at different points on the screen make a pinching motion). Alternatively, the multiple touch events may represent independent events (e.g., painting using two different brushes at the same time, or using a brush and a deletion tool simultaneously).

Referring to FIG. 9B, a plurality of touch trajectory information TTRAJ stored in the memory 560 and corresponding to the plurality of touch events TE1, TE2, and TE3 in FIG. 9A are illustrated. As illustrated in FIG. 9B, a touch trajectory table including the plurality of touch trajectory information TTRAJ may be generated by accumulating and storing the touch coordinate information TCOOR, the first touch attribute information TA1, and the second touch attribute information TA2 for each of the plurality of touch events TE1, TE2 and TE3. In the touch trajectory table of FIG. 9B, a touch identification (ID) may be assigned or allocated according to an order of touch events. For example, a touch ID of No. 1 may be assigned to the first touch event TE1 that occurs first.

For example, the second touch event TE2 may represent an action of drawing a line in red with a brush using a 4*6 oval pointer. For example, the third touch event TE3 may represent an action of erasing a line with an eraser using a 15*15 circular pointer.

Figure 10:
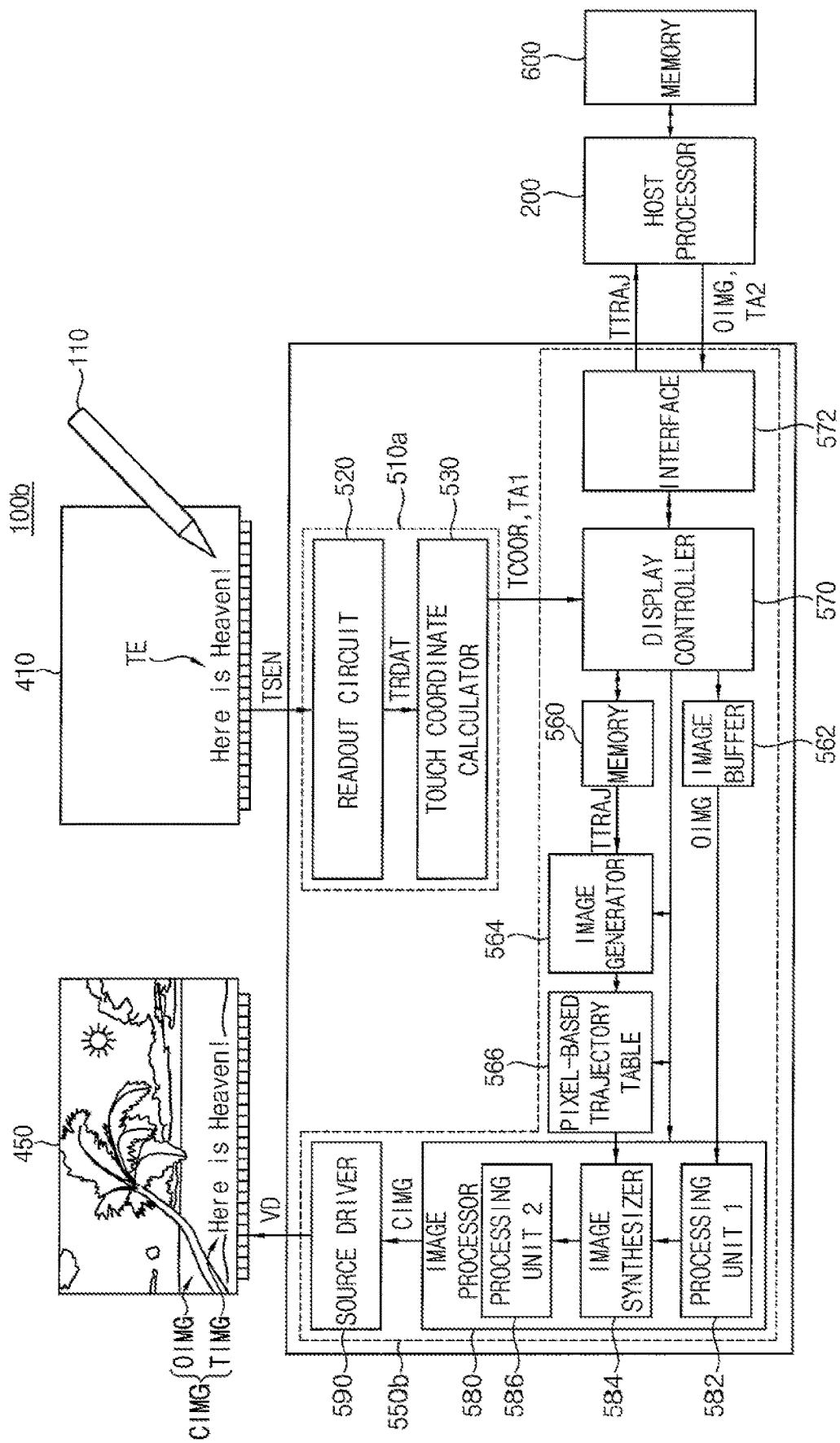
FIGS. 10, 11 and 12 are diagrams illustrating other examples of a touch and display control device, a display device and an electronic system of FIG. 1.
Figure 11:
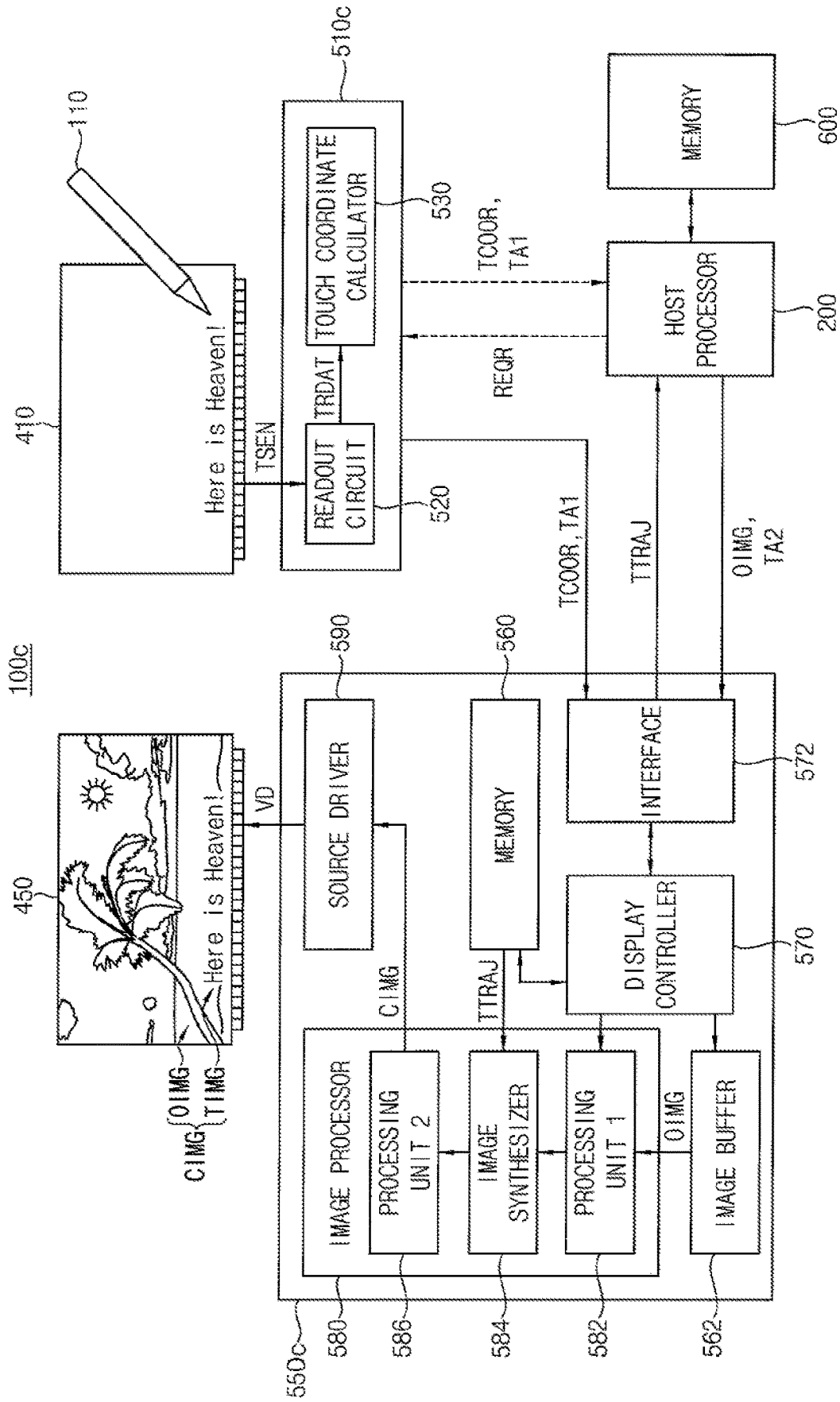
Figure 12:
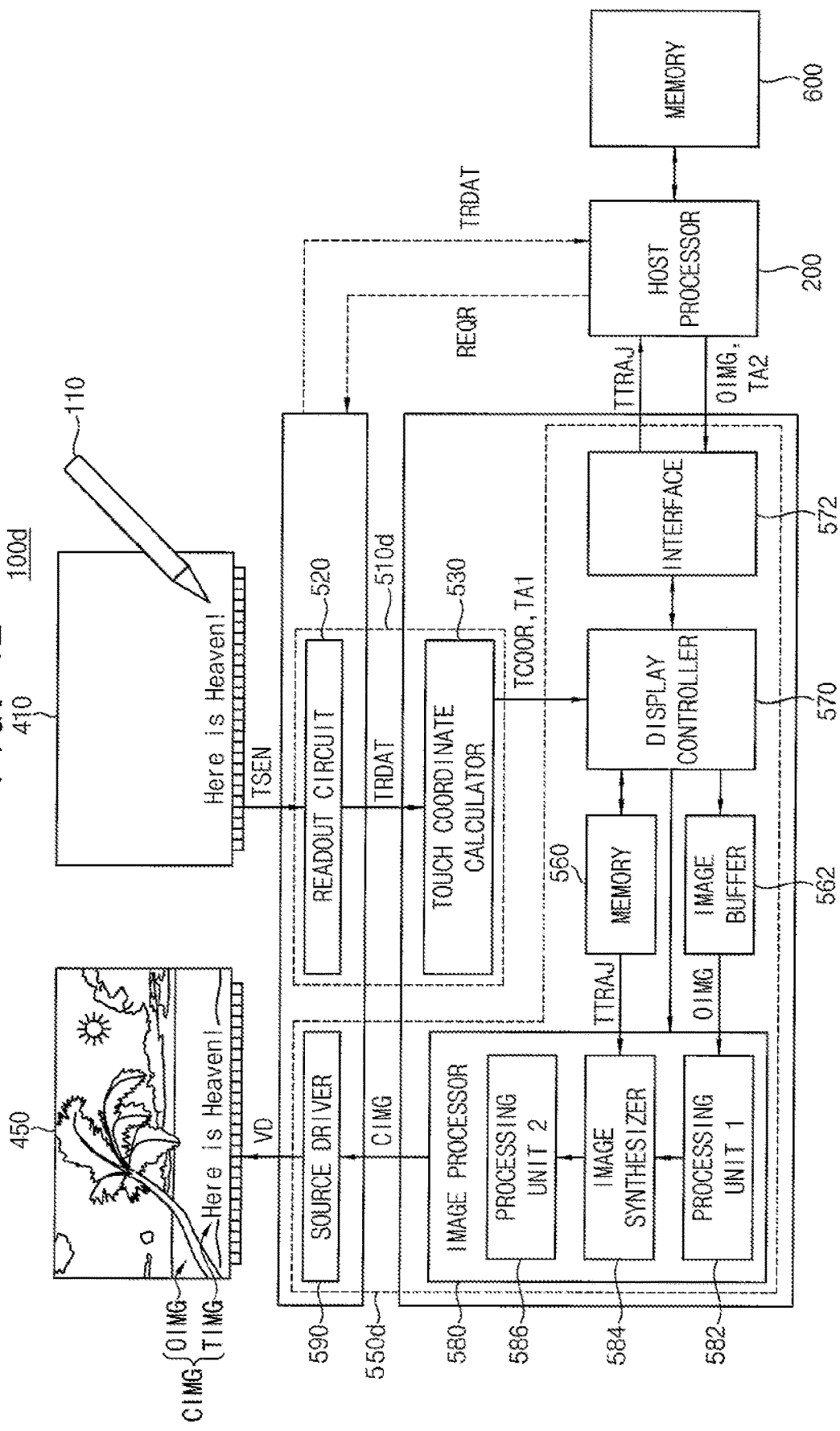

FIGS. 10, 11, and 12 are diagrams illustrating other examples of a touch and display control device, a display device, and an electronic system of FIG. 1. The descriptions repeated with FIG. 2 will be omitted.

Referring to FIG. 10, an electronic system 100b includes a host processor 200, a display device, and a memory 600. The display device includes a panel that includes a touch screen panel 410 and a display panel 450, and a touch and display control device with a touch screen controller 510a and a display driver 550b.

The display driver 550b may include a memory 560, a display controller 570, an image processor 580 and a source driver 590. The display driver 550b may further include an image buffer 562, an image generator 564, a pixel-based trajectory table 566 and an interface 572.

The electronic system 100b of FIG. 10 may be substantially the same as the electronic system 100a of FIG. 2, except that a configuration of the display driver 550b is partially changed. The display driver 550b in FIG. 10 may be substantially the same as the display driver 550a in FIG. 2, except that the display driver 550b further includes the image generator 564 and the pixel-based trajectory table 566.

The pixel-based trajectory table 566 may be implemented in the form of storing grayscale information of pixels in a touch area to be displayed based on the trajectory coordinates. For example, the pixel-based trajectory table 566 may be implemented as illustrated in FIG. 9B. The image generator 564 may perform at least a portion of the image generating operations performed by the image processor 580. In other words, FIG. 10 illustrates an example in which a block or intellectual property (IP) that performs some operations or functions of the image processor 580 is disposed outside the image processor 580.

Referring to FIG. 11, an electronic system 100c includes a host processor 200, a display device and a memory 600. The display device includes a panel that includes a touch screen panel 410 and a display panel 450, and a touch and display control device that includes a touch screen controller 510c and a display driver 550c.

FIG. 11 illustrates an example in which the touch screen controller 510c and the display driver 550c are formed of separate chips. In other words, the electronic system 100c of FIG. 11 may be substantially the same as the electronic system 100a of FIG. 2, except that the touch screen controller 510c and the display driver 550c are divided into the separate chips.

In some example embodiments, an interface used for transmitting the touch coordinate information TCOOR and the first touch property information TA1 from the touch screen controller 510c to the display driver 550c may be an interface with relatively low speed. The speed of the interface may be low compared to transmission paths within the touch screen controller 510c to the display driver 550c. In some embodiments, the interface may be an inter-integrated circuit (I2C) interface or a serial peripheral interface (SPI). However, example embodiments are not limited thereto, and the interface may be any interface implemented with various schemes.

Referring to FIG. 12, an electronic system 100d includes a host processor 200, a display device and a memory 600. The display device includes a panel that includes a touch screen panel 410 and a display panel 450, and a touch and display control device that includes a touch screen controller 510d and a display driver 550d.

FIG. 12 illustrates an example in which a part of the touch screen controller 510d and a part of the display driver 550d are formed of one chip, and another part of the touch screen controller 510d and another part of the display driver 550d are formed of another chip. In other words, the electronic system 100d of FIG. 12 may be substantially the same as the electronic system 100a of FIG. 2, except that the touch screen controller 510d and the display driver 550d are implemented with two chips.

In some example embodiments, the readout circuit 520 and the source driver 590 may be formed of a single chip, and the touch coordinate calculator 530, the memory 560, the image buffer 562, the display controller 570, the interface 572 and the image processor 580, which are components other than the readout circuit 520 and the source driver 590, may be formed of another single chip. The readout circuit 520 and the source driver 590 may correspond to analog circuits, and the touch coordinate calculator 530, the memory 560, the image buffer 562, the display controller 570, the interface 572 and the image processor 580 may correspond to digital circuits. Therefore, the analog circuits may be implemented with one chip, and the digital circuits may be implemented with another chip. Alternatively, the readout circuit 520 and the source driver 590 may be manufactured separately and may be formed of separate chips.

In the examples of FIGS. 11 and 12, the host processor 200 may directly receive touch-related information from the touch screen controllers 510c and 510d and receive the touch trajectory information TTRAJ from the display drivers 550c and 550d. For example, as illustrated in FIG. 11, the host processor 200 may generate a coordinate request signal REQC, and the touch screen controller 510c may transmit the touch coordinate information TCOOR and the first touch attribute information TA1 to the host processor 200 based on the coordinate request signal REQC. For another example, as illustrated in FIG. 12, the host processor 200 may generate a raw data request signal REQR, and the touch screen controller 510d may transmit the touch raw data TRDAT to the host processor 200 based on the raw data request signal REQR. However, even in these cases, the touch image TIMG and the composite image CIMG may be internally and/or self generated and processed according to example embodiments.

In some example embodiments, although not illustrated in FIGS. 11 and 12, the display drivers 550c and 550d in FIGS. 11 and 12 may further include the image generator 564 and the pixel-based trajectory table 566 as described with reference to FIG. 10.

The above-described various example embodiments are implemented by hardware components, software components or combinations of the hardware components and the software components. Examples of hardware components that may be used to perform the operations described in the present disclosure include controllers, sensors, generators, drivers, memories, comparators, arithmetic logic units, adders, subtractors, multipliers, dividers, integrators, and any other electronic components configured to perform the operations described in the present disclosure. In other examples, one or more of the hardware components that perform the operations described in the present disclosure are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices configured to respond to and execute instructions in a defined manner to achieve a desired result. In one example, a processor or computer includes, or is connected to, one or more memories storing instructions or software that may be executed by the processor or computer. Hardware components implemented by a processor or computer may execute instructions or software, such as an operating system (OS)

and one or more software applications that run on the OS, to perform the operations described in the present disclosure. The hardware components may also access, manipulate, process, create, and store data in response to the execution of the instructions or software. For simplicity, the singular term "processor" or "computer" may be used in the description of the examples described in the present disclosure, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component or two or more hardware components.

Figure 13:
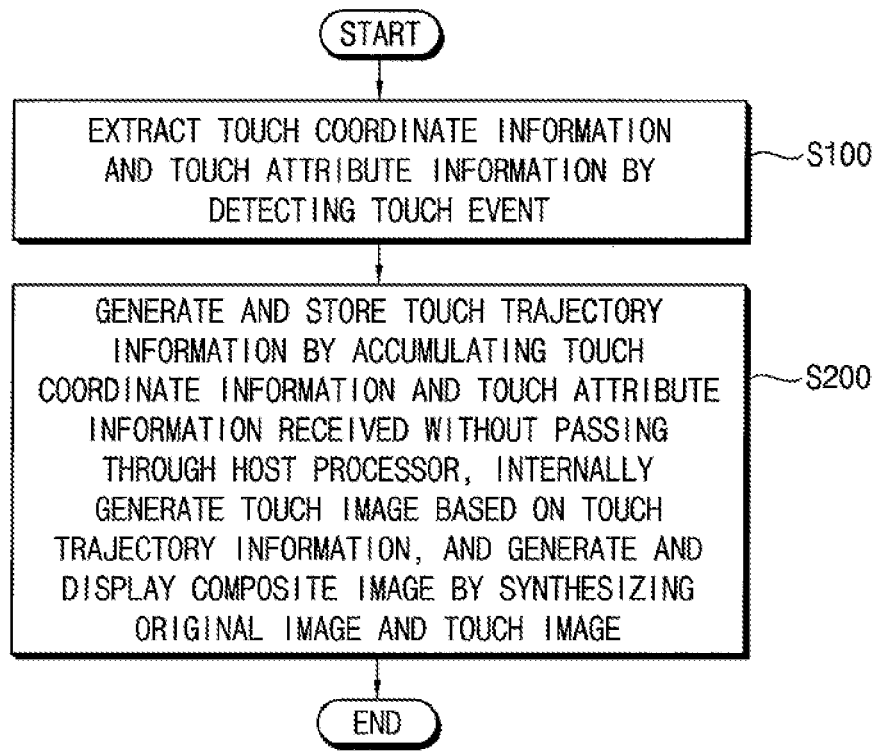
FIG. 13 is a flowchart illustrating a method of operating a display device according to example embodiments.

FIG. 13 is a flowchart illustrating a method of operating a display device according to example embodiments.

Referring to FIG. 13, a display device, according to example embodiments, includes a touch screen panel, a display panel, and a touch and display control device. The touch and display control device includes a touch screen controller and a display driver. Configurations and operations of the display device may be substantially the same as described with reference to FIGS. 1 through 12.

In a method of operating the display device according to example embodiments, the touch screen controller extracts touch coordinate information and touch attribute information by detecting a touch event on the touch screen panel (step S100). Step S100 will be described with reference to FIG. 14.

The display driver generates and stores touch trajectory information by accumulating the touch coordinate information and the touch attribute information received without passing through a host processor, internally generates a touch image to be displayed together with an original image based on the touch trajectory information, and generates and displays a composite image by synthesizing the original image and the touch image (step S200). Step S200 will be described with reference to FIGS. 15 through 17.

Figure 14:
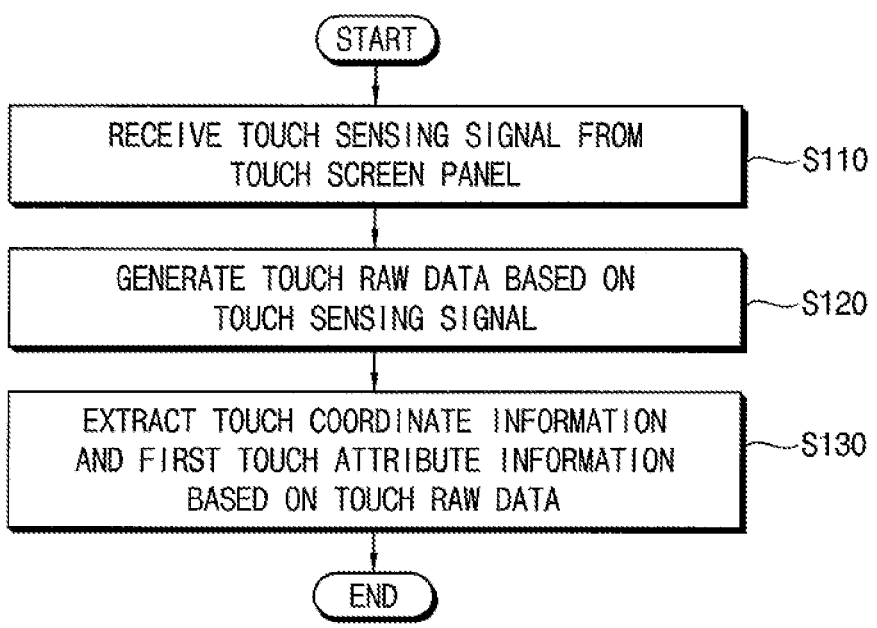
FIG. 14 is a flowchart illustrating an example of step S100 in FIG. 13.

FIG. 14 is a flowchart illustrating an example of step S100 in FIG. 13.

Referring to FIGS. 13 and 14, when extracting the touch coordinate information and the touch attribute information by the touch screen controller (step S100), a touch sensing signal may be received from the touch screen panel (step S110). Touch raw data may be generated based on the touch sensing signal (step S120). For example, steps S110 and S120 may be performed by a readout circuit (e.g., the readout circuit 520 in FIG. 2) included in the touch screen controller.

The touch coordinate information and first touch attribute information may be extracted based on the touch raw data (step S130). For example, step S130 may be performed by a touch coordinate calculator (e.g., the touch coordinate calculator 530 in FIG. 2) included in the touch screen controller.

Figure 15:
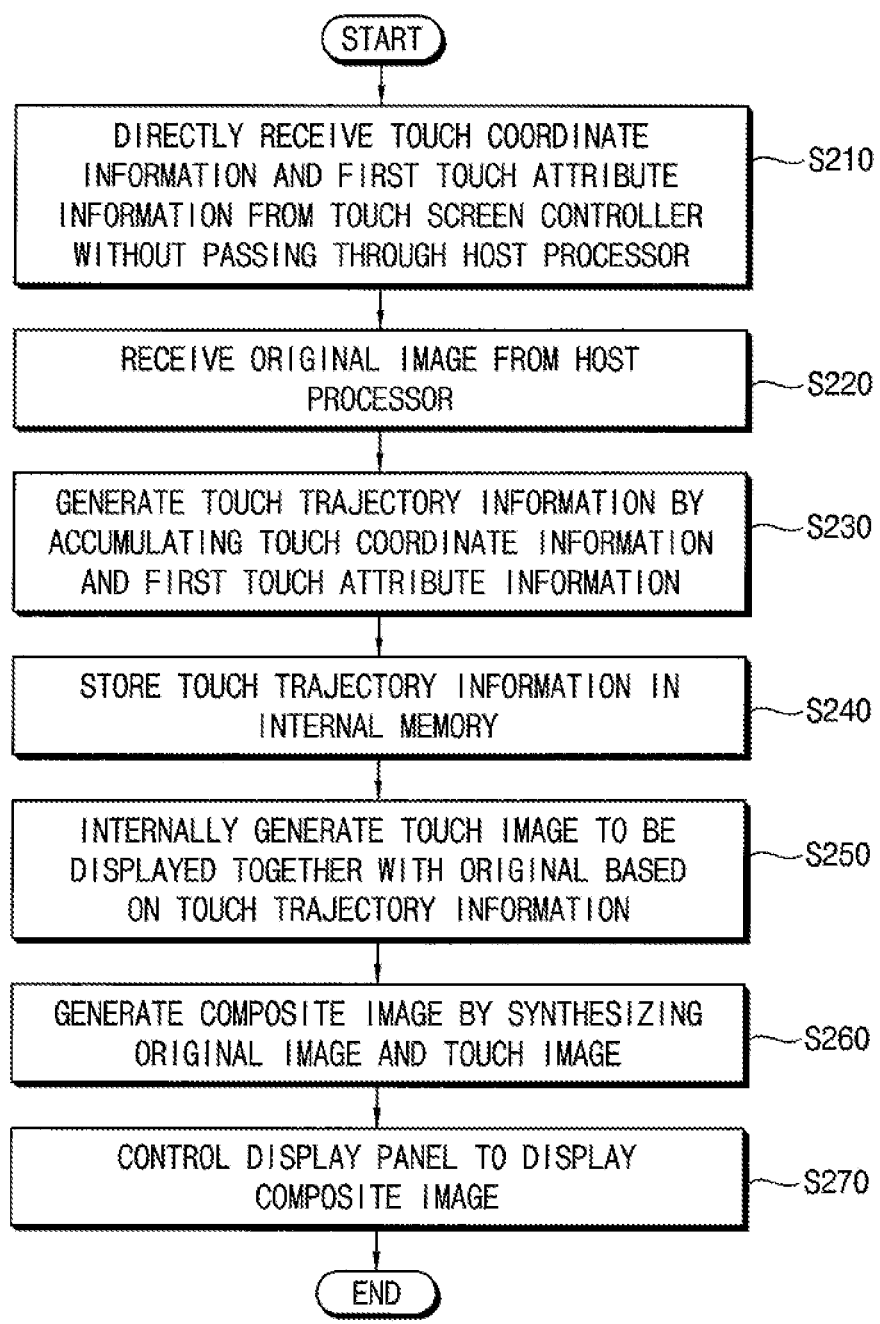
FIG. 15 is a flowchart illustrating an example of step S200 in FIG. 13.

FIG. 15 is a flowchart illustrating an example of step S200 in FIG. 13.

Referring to FIGS. 13 and 15, when generating and storing the touch trajectory information, internally generating the touch image, and generating and displaying the composite image by the display driver (step S200), the touch coordinate information and the first touch attribute information may be directly received from the touch screen controller without passing through the host processor (step S210). The original image may be received from the host processor (step S220). The touch trajectory information may be generated by accumulating the touch coordinate information and the first touch attribute information (step S230). For example, steps S210, S220, and S230 may be performed by a display controller (e.g., the display controller 570 in FIG. 2) included in the display driver.

In some example embodiments, the second touch attribute information may be further received from the host processor in step S220. The touch trajectory information may be generated by accumulating the touch coordinate information, the first touch attribute information, and the second touch attribute information in step S230.

The touch trajectory information may be stored in an internal memory (step S240). For example, step S240 may be performed by a memory (e.g., the memory 560 in FIG. 2) included in the display driver.

The touch image to be displayed together with the original image may be internally generated based on the touch trajectory information (step S250). The composite image may be generated by synthesizing the original image and the touch image (step S260). The display panel may be controlled to display the composite image (step S270). For example, steps S250 and S260 may be performed by an image synthesizer (e.g., the image synthesizer 584 in FIG. 2) included in the display driver, and step S270 may be performed by a source driver (e.g., the source driver 590 in FIG. 2) included in the display driver.

Figure 16:
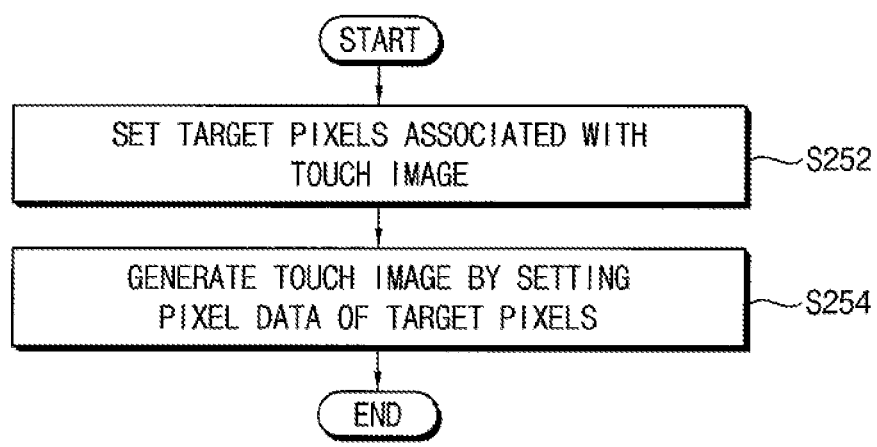
FIG. 16 is a flowchart illustrating an example of step S250 in FIG. 15.

FIG. 16 is a flowchart illustrating an example of step S250 in FIG. 15. FIG. 16 illustrates an example in which the operation of generating the composite image is performed after the operation of internally generating the touch image is performed.

Referring to FIGS. 15 and 16, when internally generating the touch image (step S250), target pixels associated with the touch image may be set (step S252). The touch image may be generated by setting pixel data of the target pixels (step S254). After that, the composite image may be generated by synthesizing the original image and the touch image. The example of FIG. 16 may correspond to the operation described with reference to FIGS. 5A, 5B, 5C and 6.

Figure 17:
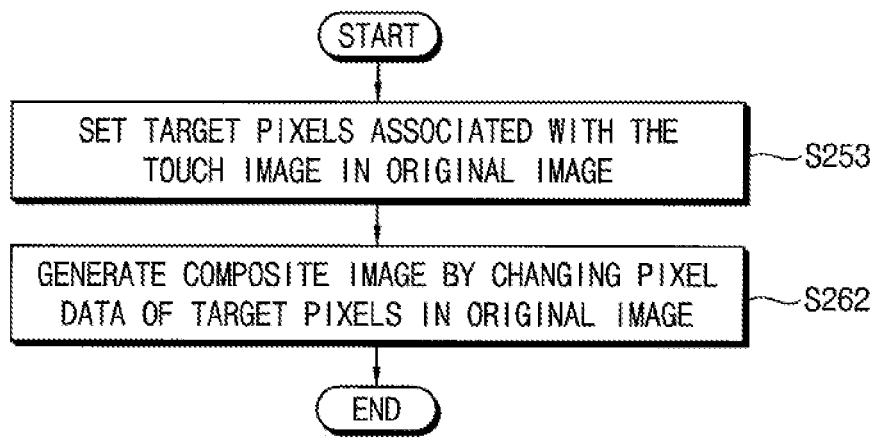
FIG. 17 is a flowchart illustrating an example of steps S250 and S260 in FIG. 15.

FIG. 17 is a flowchart illustrating an example of steps S250 and S260 in FIG. 15. FIG. 17 illustrates an example in which the operation of internally generating the touch image and the operation of generating the composite image are substantially simultaneously performed.

Referring to FIGS. 15 and 17, when internally generating the touch image (step S250), target pixels associated with the touch image may be set in the original image (step S253). When generating the composite image (step S260), the composite image may be generated by changing pixel data of the target pixels in the original image (step S262). The example of FIG. 17 may correspond to the operation described with reference to FIGS. 7A, 7B, 7C, and 8.

As will be appreciated by those skilled in the art, the inventive concept may be embodied as a system, method, computer program product, and/or a computer program product embodied in one or more computer-readable medium(s) with computer readable program code embodied thereon. The computer-readable program code may be provided to a processor of a general-purpose computer, special-purpose computer, or other programmable data processing apparatus. The computer-readable medium may be a computer-readable signal medium or a computer readable storage medium. The computer readable storage medium may be any tangible medium that can contain or store a program for use by or in connection with an instruction execution system, apparatus, or device. For example, the computer-readable medium may be a non-transitory computer-readable medium.

FIG. 18 is a block diagram illustrating an electronic system according to example embodiments.

Referring to FIG. 18, an electronic system 1000 may include a processor 1010, a memory device 1020, a connectivity 1030, an input/output (I/O) device 1040, a power supply 1050 and a display device 1060. The electronic system 1000 may further include a plurality of ports for communicating a video card, a sound card, a memory card, a universal serial bus (USB) device, other electronic devices, etc.

The processor 1010 controls the operations of the electronic system 1000. The processor 1010 may execute an operating system and at least one application to provide an internet browser, games, videos, or the like. The memory device 1020 may store data for the operations of the electronic system 1000. The connectivity 1030 may communicate with an external system (not illustrated) using wired and/or wireless communication. The I/O device 1040 may include an input device such as a keyboard, a keypad, a mouse, a remote controller, etc., and an output device such as a printer, a speaker, etc. The power supply 1050 may provide power for the operations of the electronic system 1000.

The display device 1060 may be the display device according to example embodiments. The display device 1060 may include a touch screen panel, a display panel, and the touch and display control device according to example embodiments. The processor 1010, the display device 1060, and the memory device 1020 may correspond to the host processor 200, the display device 300, and the memory 600 in FIG. 1, respectively.

The inventive concept may be applied to various devices and systems that include the display devices with the touch screen panels. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A touch and display control device comprising:

a touch screen controller configured to receive a touch sensing signal from a touch screen panel, to generate touch raw data based on the touch sensing signal, and to extract touch coordinate information and first touch attribute information based on the touch raw data; and a display driver configured to receive an original image from a host processor, to directly receive the touch coordinate information and the first touch attribute information from the touch screen controller, to generate touch trajectory information by accumulating the touch coordinate information and the first touch attribute information, to transmit the touch trajectory information to the host processor, to internally generate a touch image to be displayed together with the original image based on the touch trajectory information, to generate a composite image by synthesizing the original image and the touch image, and to control a display panel to display the composite image, the display driver including a memory storing the touch trajectory information.

2. The touch and display control device of claim 1, wherein:

the touch coordinate information and the first touch attribute information are not transmitted from the touch screen controller to the host processor, and the touch image is not generated by the host processor, and is generated by the display driver.

3. The touch and display control device of claim 1, wherein, when the original image is a still image, the host processor enters a power-down mode after the host processor transmits the original image to the display driver.

4. The touch and display control device of claim 3, wherein the display driver further includes:

an image buffer configured to store the original image.

5. The touch and display control device of claim 1, wherein the display driver is further configured to periodically transmit the touch trajectory information stored in the memory to the host processor.

6. The touch and display control device of claim 1, wherein the display driver is further configured to transmit the touch trajectory information stored in the memory to the host processor when a request is received from the host processor or depending on a state of the memory.

7. The touch and display control device of claim 1, wherein the display driver is further configured to:

receive second touch attribute information that is different from the first touch attribute information from the host processor, and generate the touch trajectory information by accumulating the touch coordinate information, the first touch attribute information and the second touch attribute information.

8. The touch and display control device of claim 7, wherein:

the first touch attribute information includes at least one of a shape, a size, a direction and a writing pressure associated with a touch event corresponding to the touch sensing signal, and the second touch attribute information includes at least one of a tool and a color defined for the touch event.

9. The touch and display control device of claim 7, wherein the display driver is further configured to:
set target pixels associated with the touch image based on the touch trajectory information, and
generate the touch image by setting pixel data of the target pixels based on the second touch attribute information.

10. The touch and display control device of claim 7, wherein the display driver is further configured to:
set target pixels associated with the touch image in the original image based on the touch trajectory information, and
generate the composite image by changing pixel data of the target pixels in the original image based on the second touch attribute information, wherein an operation of internally generating the touch image and an operation of generating the composite image are simultaneously performed.

11. The touch and display control device of claim 7, wherein, the display driver is further configured to generate a touch trajectory table including a plurality of touch trajectory information by accumulating the touch coordinate information, the first touch attribute information and the second touch attribute information for each of a plurality of touch events when the plurality of touch events occur simultaneously.

12. The touch and display control device of claim 1, wherein the touch screen controller includes:
a readout circuit configured to generate the touch raw data based on the touch sensing signal; and
a touch coordinate calculator configured to extract the touch coordinate information and first touch attribute information based on the touch raw data.

13. The touch and display control device of claim 12, wherein the display driver further includes:
a display controller configured to generate the touch trajectory information by accumulating the touch coordinate information and the first touch attribute information, and to provide the touch trajectory information to the memory;
an image processor configured to internally generate the touch image based on the touch trajectory information, and to generate the composite image by synthesizing the original image and the touch image; and
a source driver configured to generate a plurality of data voltages provided to the display panel based on the composite image.

14. The touch and display control device of claim 13, wherein:
the readout circuit and the source driver are formed of one chip, and
the touch coordinate calculator, the display controller and the image processor are formed of another chip.

15. The touch and display control device of claim 1, wherein the touch screen controller and the display driver are formed of one chip.

16. The touch and display control device of claim 1, wherein the touch screen controller and the display driver are formed of separate chips.

17. A method of operating a display device, the method comprising:
receiving, by a display driver, an original image from a host processor;
extracting, by a touch screen controller, touch coordinate information and first touch attribute information by detecting a touch event on a touch screen panel;
directly receiving, by the display driver, the touch coordinate information and the first touch attribute information from the touch screen controller without passing through the host processor;
generating, by the display driver, touch trajectory information by accumulating the touch coordinate information and the first touch attribute information;
storing, by the display driver, the touch trajectory information in an internal memory;
transmitting, by the display driver, the touch trajectory information to the host processor;
internally generating, by the display driver, a touch image to be displayed together with the original image based on the touch trajectory information;
generating, by the display driver, a composite image by synthesizing the original image and the touch image; and
controlling, by the display driver, a display panel to display the composite image.

18. The method of claim 17, wherein:
an operation of generating the composite image is performed after an operation of internally generating the touch image is performed, and
internally generating the touch image includes:
setting target pixels associated with the touch image; and
generating the touch image by setting pixel data of the target pixels.

19. The method of claim 17, wherein:
an operation of internally generating the touch image and an operation of generating the composite image are simultaneously performed, and
internally generating the touch image and generating the composite image include:
setting target pixels associated with the touch image in the original image; and
generating the composite image by changing pixel data of the target pixels in the original image.

20. An electronic system comprising:
a display device, and
a host processor configured to control the display device; and
the display device comprising:
a touch screen panel configured to detect a touch event;
a display panel configured to display an original image and a touch image corresponding to the touch event together; and
a touch and display control device configured to control operations of the touch screen panel and the display panel,
the touch and display control device comprising:
a readout circuit configured to receive a touch sensing signal corresponding to the touch event from the touch screen panel, and to generate touch raw data based on the touch sensing signal;
a touch coordinate calculator configured to extract touch coordinate information and first touch attribute information based on the touch raw data;
a display controller configured to directly receive the touch coordinate information and the first touch attribute information from the touch coordinate calculator without passing through the host processor, to receive the original image and second touch attribute information from the host processor, to generate touch trajectory information by accumulating the touch coordinate information, the first touch attribute information and the second touch attribute information, and to transmit the touch trajectory information to the host processor;

a memory configured to store the touch trajectory information;

an image buffer configured to store the original image;

an image processor configured to internally generate the touch image to be displayed together with the original image based on the touch trajectory information, and to generate a composite image by synthesizing the original image and the touch image; and a source driver configured to generate a plurality of data voltages provided to the display panel based on the composite image, wherein the touch coordinate information and the first touch attribute information are not transmitted from the touch coordinate calculator to the host processor, wherein the touch image is not generated by the host processor, and is generated by the touch and display control device, wherein, when the original image is a still image, the host processor enters a power-down mode after the host processor transmits the original image to the touch and display control device, and wherein the touch and display control device is configured to transmit the touch trajectory information stored in the memory to the host processor periodically or depending on a state of the memory or when a request is received from the host processor.

* * * * *